US009562982B1

(12) United States Patent
McConnell et al.

(10) Patent No.: US 9,562,982 B1
(45) Date of Patent: Feb. 7, 2017

(54) COHERENT SOUND SOURCE FOR MARINE SEISMIC SURVEYS

(71) Applicant: Applied Physical Sciences Corp., Groton, CT (US)

(72) Inventors: James A. McConnell, Vienna, VA (US); Evan F. Berkman, Newton, MA (US); Bruce S. Murray, Winchester, MA (US); Bruce M. Abraham, Waterford, CT (US); Daniel A. Roy, Westerly, RI (US)

(73) Assignee: Applied Physical Sciences Corp., Groton, CT (US)

( * ) Notice: Subject to any disclaimer, the term of this patent is extended or adjusted under 35 U.S.C. 154(b) by 76 days.

(21) Appl. No.: 14/700,879

(22) Filed: Apr. 30, 2015

Related U.S. Application Data

(63) Continuation-in-part of application No. 14/421,006, filed as application No. PCT/US2013/054082 on Aug. 8, 2013.

(60) Provisional application No. 61/682,461, filed on Aug. 13, 2012.

(51) Int. Cl.
*G01V 1/02* (2006.01)
*G01V 1/38* (2006.01)

(52) U.S. Cl.
CPC ............... *G01V 1/159* (2013.01); *G01V 1/38* (2013.01); *G01V 1/3817* (2013.01)

(58) Field of Classification Search
CPC ........ G01V 1/159; G01V 1/3861; G01V 1/38; G01V 1/3817
See application file for complete search history.

(56) References Cited

U.S. PATENT DOCUMENTS

| | | |
|---|---|---|
| 3,684,050 A | 8/1972 | Johnston |
| 5,062,089 A | 10/1991 | Willard et al. |
| 6,483,778 B1 | 11/2002 | Pozzo et al. |
| 2002/0141287 A1 | 10/2002 | Lazaratos |
| 2012/0113756 A1 | 5/2012 | Carcaterra et al. |
| 2015/0234072 A1* | 8/2015 | McConnell ............ G01V 1/159 367/156 |

* cited by examiner

*Primary Examiner* — Daniel Pihulic

(57) ABSTRACT

A coherent sound source is provided for marine seismic surveys. An exemplary underwater sound projector comprises a plurality of pistons actuated by an electromagnetic force generator having components comprising a stator, armatures, electrical coils, and permanent magnets. The pistons and the components are arranged to create mechanical and magnetic symmetry about a geometric center of the projector to reduce reaction loads that occur when the pistons are actuated. The stator and the armatures have magnetic poles that employ a tapered geometry. The projector optionally includes control systems to improve the fidelity of the force generator, provide pressure compensation to the pistons, finely adjust the static position of the pistons, and/or change the depth and roll when the projector is configured as a tow body. A plurality of such projectors can be configured in an array. An umbilical can connect the projectors to a vessel, transmit electrical power and compressed gas to each array element and/or provide a data transmission medium between the projector and the vessel.

19 Claims, 11 Drawing Sheets

200

300

500

1000

COHERENT SOUND SOURCE FOR MARINE SEISMIC SURVEYS

CROSS-REFERENCE TO RELATED APPLICATIONS

The present application is a continuation in part of U.S. patent application Ser. No. 14/421,006, filed Feb. 11, 2015, entitled "Coherent Sound Source for Marine Seismic Surveys," which claims priority to Patent Cooperation Treaty (PCT) Application Serial No. PCT/US13/54082, filed Aug. 8, 2013 and U.S. Provisional Patent Application Ser. No. 61/682,461, filed Aug. 13, 2012, each incorporated by reference herein.

FIELD OF THE INVENTION

The present invention relates generally to piston-type underwater sound projectors that employ an electromagnetic driver and have application to marine seismic surveys.

BACKGROUND OF THE INVENTION

Sound waves are the primary tool used to search for oil and gas reserves beneath the Earth's strata. Sound waves are convenient because they can propagate over long distances and penetrate into complex layered media to obtain important information regarding the presence, composition, and physical extent of reserves. This is the case for surveys conducted on both land and water. Although a variety of methods have been used to generate sound waves in water, the primary technique over the past three decades is the use of air guns, which expel short bursts of high-pressure air. The creation and collapse of air bubbles produced by this process causes high-energy sound waves to be directed toward the seafloor with approximately 98% of the energy generated over the frequency range from 5 to 200 Hz. The waves penetrate into the strata and differentially reflect back towards the surface where they are recorded by an array of receivers (i.e., hydrophones).

Generally speaking, marine seismic surveys are performed by towing 12 to 48 air guns 300 to 500 m behind a survey vessel at depths on the order of 1 to 10 m. The air guns are typically configured in a planar array and produce source levels up to 240 dB re 1 μPa–m. These are impulsive sounds that result from the sudden discharge of high-pressure air which repeats a regular intervals ranging from 5 to 20 seconds. The receiving array that records the direct and reflected sound waves is usually comprised of up to 16 streamers each with hundreds of hydrophones. The streamers are typically 3 to 12 km long and have a lateral spacing anywhere from 50 to 100 m. The source-receiver configuration coupled with tow speeds ranging from 1.5 to 2.5 m/s facilitates survey rates on the order of 10 km$^2$/day.

For more information on marine seismic surveys, please consult "Marine Geophysical Operations: An Overview," *International Association of Geophysical Contractors* (June 2009), or "An Overview of Marine Seismic Operations," *International Association of Oil and Gas Producers*, Report No. 448 (April 2011), each incorporated by reference herein. For more information on air guns used in marine seismic surveys, please see, e.g., W. Dragoset, "An introduction to Air Guns and Air-Gun Arrays," *The Leading Edge,* 19 (8), 892-897 (2000) or J. Caldwell and W. Dragoset, "A Brief Overview of Seismic Air-gun Arrays," *The Leading Edge,* 19 (8), 898-902 (2000), each incorporated by reference herein.

For many years there have been growing concerns by environmentalists, scientists, and governments that increasing sound levels in the marine environment might be detrimental to a variety of marine life. Marine mammals are the primary concern along with fish and invertebrates which are secondary. A review of these issues as they pertain to marine mammals can be found in "Airgun Arrays and Marine Mammals," *International Association of Geophysical Contractors* (August 2002), incorporated by reference herein. Because of the increasing concerns over potential sound effects to marine biota, there are growing concerns that marine seismic surveys could be significantly restricted by future regulations. With these concerns in mind, the oil and gas industry has considered alternatives to air guns, and in particular using marine vibrators that can provide a coherent (i.e., non-impulsive) of acoustic energy to enhance the efficacy of the system. There are numerous features that marine vibrator-based seismic survey systems offer that are important as they relate to environmental considerations. For example:

(1) The use of a coherent source can provide excitation over a much longer time interval than an incoherent (i.e., impulsive) source, such as an air gun, which is thought to pose lower risk to marine life because the same nominal energy, over a specific hand of interest, can be spread-out over time rather than being concentrated at an instant;

(2) The use of at coherent source has at greater propensity to reduce or eliminate high-frequency components (e.g., sounds greater than 100 Hz) relative to an incoherent source since the frequency domain representation of the signals associated with a coherent source are typically concentrated at deterministic and controllable frequencies thereby confining the sound energy to a specific band which can be tailored to provide minimal risk to certain species of marine life.

A comprehensive review of the environmental impact of marine seismic surveys performed using marine vibrators as opposed to air guns can be obtained from "Environmental Assessment of Marine Vibroseis," prepared by LGL, Ltd and Marine Acoustics, Inc., LGL Report TA4604-1, JIP Contract 22 07-12 (April 2011), incorporated by reference herein.

While there are several environmental advantages associated with the use of coherent sound sources for marine seismic surveys, there are also benefits of using them to improve the performance of the survey system as a whole. For example, the use of coherent sound sources for marine seismic surveys allows the excitation signal associated with the projector array and the signal processing algorithms associated with the receive array to be tailored so that the most accurate image of the layered media under evaluation is created. Some examples of excitation signals include, but are not limited to frequency-modulated (FM) sweeps and pseudo-random noise (PRN).

Resident in the characteristics of these signals is the ability of the projector (or multiple projectors used in an array) to be controlled in a precise manner, which is not an easy or straightforward proposition with incoherent sources like air guns. Data collection systems that rely on FM and PRN signals can employ signal processing techniques such as matched filters to improve the signal-to-noise ratio without the need for increasing the source level. Processing gains can also be achieved through long integration times associated with coherent signals which are generated for extended periods of time. Reference textbooks that provide the details of these processing techniques as well as others include W. S. Burdic, *Underwater Acoustic System Analysis*, Prentice Hall, Inc. (1984); and A. D. Whalen *Detection of Signals in Noise*, Academic Press (1971), each incorporated by reference herein.

Historically speaking, the use of coherent sound sources in connection with marine seismic surveys has not been widespread, but some devices have been reduced to practice and disclosed in open-literature. Marine vibrators comprised of a hydraulically actuated piston and a flextensional transducer have been developed some time ago as described in W. D. Weber and G. R. Johnson, "An Environmentally Sound Geophysical Source—The Transition Zone Marine Vibrator," *Conference Proceedings, Society of Petroleum Engineers*, Paper SPE 46805 (1988) and "PGS Electrical Marine Vibrator," *Techlink—A Publication of PGS Geophysical*, 11 (5) (November 2005), each incorporated by reference herein. The concept of a hydraulically actuated piston designed for in-water use is an adaptation of the principal transduction mechanism employed by land vibrators such as those developed by Industrial Vehicles International (Tulsa, Okla.). The flextensional transducer developed by PGS (Oslo, Norway) generally conforms to a Class IV design and has taken on several embodiments over a 20-year period as evidenced by U.S. Pat. Nos. 5,329,499, 5,757,726, 6,085,862, 7,551,518, 7,881,158, and 8,446,798, each incorporated by reference herein. It can be gleaned from these patents that the inventors considered transducer designs which employed drive elements positioned on either the major or minor axes of the flex tensional shell. In addition, they considered the use of drive elements which relied on either magnetostrictive, piezoelectric, electrodynamic, or other principals to convert electrical energy into mechanical motion of the flextensional shell. It is speculated that the variations in projector design were implemented so that the device could meet performance requirements in the operational band of interest (i.e., nominally 5 to 100 Hz). Interestingly, in the PGS publication cited above, two separate flextensional transducers are required to cover the entire band of interest. Also, this particular device employed a magnetostrictive driver positioned along the major axis of the flextensional shell.

In recent years, researchers at Teledyne-Webb Research (North Falmouth, Mass.) and CGG Veritas (Paris, France) have patented devices that are intended for use in connection with marine seismic surveys. Teledyne-Webb Research is exploiting the bubble transducer concept first introduced in 1960 and later patented in 1965 as evidenced by C. C. Sims, "Bubble Transducer for Radiating High-Power. Low-Frequency Sound in Water," *J. Acoust. Soc. Am.*, 32, 1305-1308 (1960) and U.S. Pat. No. 3,219,970, respectively, both incorporated by reference herein. The transducers under development by Teledyne-Webb Research are described in U.S. Pat. Nos. 8,331,198, 8,441,892, and 8,634,276, each incorporated by reference herein, and claim to expand and improve upon the original concept developed by Sims. In contrast to the bubble transducer, CGG Veritas is developing a piston-type sound projector as evidenced by U.S. Pat. Nos. 8,830,794 and 8,837,259, both incorporated by reference herein. These patents describe projectors that employ two separate actuators to generate sound over the desired band of interest. One of the actuators relies on dynamic regulation of the compensating gas pressure contained within the enclosure which houses the piston. The other actuator relies on either a moving-coil or moving-magnet transducer to drive the piston and is therefore electrodynamic in its core principal of operation provided the actuation force, as described by Lorentz, is proportional to the cross-product between magnetic field B and current I in the coil. The pressure regulation actuator is typically used for sound waves at frequencies below 4 Hz, whereas the electrodynamic actuator is typically used for sound waves at frequencies greater than or equal to 4 Hz. It should be stated that numerous aspects of the electrodynamic actuator, pressure compensation system, piston geometry and arrangement, etc. associated with the devices covered in U.S. Pat. Nos. 8,830,794 and 8,837,259 are similar to that described in B. S. Willard, "A Towable, Moving-Coil Acoustic Target for Low Frequency Array Calibration," NUSC Technical Report 6369, dated Apr. 29, 1981 (DTIC Report No. ADA099872), incorporated by reference herein.

As discussed further below, aspects of the present invention rely on a piston-type sound projector that employs an electromagnetic driver conforming to a moving armature force generator containing a coil (i.e., winding) and permanent magnet which are fixed in space. This is in stark contrast to electrodynamic drivers which typically generate force via relative motion between a coil and permanent magnet. For more information on electromagnetic and electrodynamic force generators, consult F. V. Hunt, *Electroacoustics—The Analysis of Transduction and Its Historical Background* (Acoustical Society of America, Woodbury, N.Y. 1982), Chapters 5 and 7, incorporated by reference herein. With regard to moving armature force generators, see, for example, U.S. Pat. No. 5,206,839, 5,266,854, and 5,587,615, each incorporated by reference herein. U.S. Pat. No. 5,206,839 describes a device configured as an underwater sound projector. U.S. Pat. Nos. 5,266,854 and 5,587,615 describe devices configured as vibratory shakers. The devices described in U.S. Pat. Nos. 5,206,839 and 5,266,854 utilize a magnetic circuit comprised of E-shaped and I-shaped laminated structures (i.e., the stator and armature, respectively), wherein the E-shaped structure is fitted with separate windings for alternating and direct currents (AC and DC). The DC signal provides a magnetic bias that is used in concert with an appropriately phased AC signal to generate motion in the I-shaped structure which constitutes the moving armature assembly. This arrangement results in force output that is linear with the applied current. It is noted that without the DC magnetic bias, moving armature transducers are inherently nonlinear and tend to be undesirable for use in numerous applications.

The device described in U.S. Pat. No. 5,587,615 foregoes the use of a DC winding in favor of a permanent magnet, resulting in a magnetic circuit design that employs multiple elongate laminated structures (i.e., magnetic cores) that contain AC windings and a single permanent magnet positioned between the cores to provide the magnetic bias. This arrangement is substantially different than that described in U.S. Pat. Nos. 5,206,839 and 5,266,854, but provides force output in the moving armature assembly that is linear with the applied current.

SUMMARY OF THE INVENTION

Generally, a coherent sound source is provided for marine seismic surveys. According to one aspect of the invention, an underwater sound projector is provided for producing time-harmonic waveforms. The exemplary underwater sound projector comprises a plurality of pistons actuated by an electromagnetic force generator having components comprising a stator, armatures, electrical coils, and permanent magnets. The pistons and the components of the electromagnetic force generator are arranged to create mechanical and magnetic symmetry about a geometric center of the underwater sound projector to substantially cancel reaction loads that occur when the pistons are actuated. In addition, in the exemplary embodiment, the stator and the armatures have magnetic poles that employ a tapered geometry.

According to another aspect of the invention, the underwater sound projector optionally also includes a feedback controller and an in-line adaptive compensation filter to (i) reduce a mechanical quality factor of a fundamental resonance associated with assemblies comprising one of the pistons and one of the armatures, (ii) match a response of a plurality of the assemblies, and (iii) ensure that a far-field radiated signal from an array of the underwater sound projectors is substantially equivalent to a superposition of all array elements operating in phase with an identical source strength.

In another exemplary embodiment, the underwater sound projector optionally further comprises a pressure compensation system utilizing high pressure gas regulated by a feedback control system to balance a static load on the pistons resulting from submergence in water, wherein the high pressure gas is supplied from a plurality of storage tanks positioned within close proximity to the underwater sound projector, wherein the storage tanks comprise means to replenish the high pressure gas from an externally located source after the storage tanks are depleted.

In one or more embodiments, the underwater sound projector is contained within a cylindrical housing positioned in a substantially neutral buoyant hydrodynamic tow body comprising control surfaces operated by a feedback control system to adjust a submergence depth and a roll angle.

According to a further aspect of the invention, an array of underwater sound projectors is provided for producing time-harmonic waveforms. The array comprises a plurality of the underwater sound projectors. A load-bearing umbilical optionally (i) connects each underwater sound projector to a vessel, (ii) transmits electrical power and pressurized gas to the underwater sound projector, and (iii) provides a duplex data transmission medium to route commands from the vessel to the underwater sound projector and report machinery status to the vessel.

A more complete understanding of the present invention, as well as further features and advantages of the present invention, will be obtained by reference to the following detailed description and drawings.

DETAILED DESCRIPTION

Figure 1:
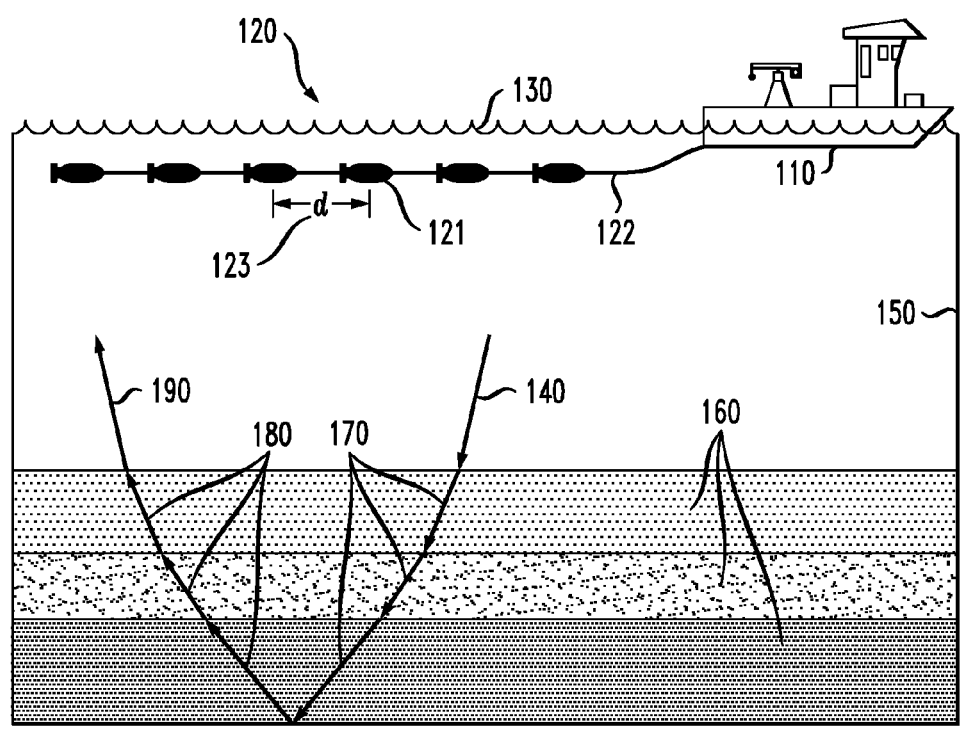
FIG. 1 presents an elevation drawing that outlines the overall concept of an exemplary embodiment of the present invention.

Aspects of the present invention provide a novel coherent sound source that can be used in a spatially distributed array to support marine seismic surveys. The motivation for the present invention stems, in part, from growing environmental concerns regarding the use of impulsive (i.e., incoherent) sound sources (i.e., air guns) as the principal imaging tool for marine seismic surveys.

Aspects of the present invention rely on a spatially distributed array of fully-integrated sound projectors to achieve the requisite source level needed to create an accurate seismic image of the complex media that makes-up the seafloor, yet does not cavitate at the relatively shallow operational depths (i.e., depths on the order of 1 to 10 m) mandated by the survey. Linear, planar, and volumetric arrays are possible with the exact geometry depending on seismic survey parameters as well as operational performance parameters for the array components and survey vessel which tows the array.

During a typical seismic survey, a survey vessel tows separate arrays to transmit and receive sound. The present invention concerns itself with the transmit array and the projector utilized by the transmit array. To this end, a load-bearing umbilical serves as the physical and electrical connection between the survey vessel and the projectors employed by the array. The umbilical transmits electrical power to each array element and serves as a duplex data transmission medium to route commands from the survey vessel to the projectors and report machinery status to the survey vessel from various components and subsystems employed by the projectors. The electrical power utilized by all the components and subsystems in each projector emanates from a dedicated DC power supply located aboard the survey vessel. Accordingly, each projector is equipped with a power regulation and distribution circuit. The umbilical optionally transmits high-pressure gas (i.e., air, nitrogen, etc.) to storage tanks located within the tow body for use in connection with the pressure compensation system.

In one embodiment, a computer located on the survey vessel serves to centrally control, monitor, and coordinate all functions of the array. Critical parameters such as array element triggering/synchronization and waveform selection are all transmitted to each projector. Once activated, the projector transmits the waveform to the acoustic medium, performs self-monitoring and control operations to ensure that the requisite source level is met, and reports status, i.e., quality control parameters, back to the central computer for further disposition. This process repeats itself until the objectives of the survey are complete. A computer located in each array node (i.e., positioned within each projector) optionally controls all aspects of the projector and contains local control authority and implementation for the principal transduction means and associated components and subsystems. Details concerning the functionality of this computer and its associated control systems are discussed below.

Aspects of the present invention rely on a sound projector configured as a near neutrally buoyant hydrodynamic tow body comprised of a structural plastic or equivalent material and containing a symmetrical arrangement of pressure-compensated pistons that are driven by a moving armature (i.e., variable reluctance) electromagnetic force generator. The pistons can take on numerous geometries such as plane, conical, convex, or a combination of these geometries. The symmetry inherent with the back-to-back arrangement of pistons ideally results in a virtual node located at the geometric center of transducer thereby providing an acceleration canceling feature that obviates the need for a reaction mass, substantially lowers the overall mass of the projector, and ensures that the device exhibits monopole, as opposed to dipole, radiation characteristics. The pistons are appropriately sized to preclude cavitation, are compliantly suspended, and sealed from seawater intrusion. The pistons employ a high strength-to-weight material with significant mechanical loss factor in order to minimize resonant amplification of any out-of-band noise (i.e., frequencies greater than 100 Hz).

The fundamental resonance of the combined piston-armature system is on the order of a few hertz to tens of hertz which indicates that the pistons will deflect inward under the action of hydrostatic pressure. Typical deflections may exceed the maximum permissible dynamic displacement associated with the piston-armature assembly, therefore a pressure compensation system is employed and consists of a regulated supply of high-pressure gas (i.e., air, nitrogen, etc.) which is applied to the backside of the pistons so that the net static force on the pistons is zero. The gas is supplied through a valve network from a series of high-pressure storage tanks that are contained within the tow body. The tanks are either stand-alone units or are connected to the survey vessel via the umbilical so they can be replenished as they are depleted. This architecture is thought to circumvent any potential latency issues that might arise if the compensation gas is supplied exclusively from the survey vessel which may be positioned up to 1 km from the projector. The valve network is actuated using a feedback control system, which is implemented and monitored by the computer positioned in the tow body. The control system sets the internal gas pressure so that the differential pressure measured by sensors located inside and outside the projector is zero. In concert with the pressure compensation system, is a system to finely adjust the static position of each piston-armature assembly. That is, given that the compensation gas is contained within a single housing, it acts on each piston simultaneously, but might not return each piston-armature assembly precisely to the neutral position as a result of machining and assembly tolerances. Returning the piston-armature assembly to the precise neutral position provides added utility to maximize the dynamic displacement of the piston. This is accomplished by superimposing a DC bias on the AC drive signal which is applied to the coil (i.e., winding) associated with each piston-armature assembly. The DC bias is controlled by the computer positioned in the tow body. The control system sets the DC bias so that the physical distance measured by a LVDT (or some equivalent sensor) positioned between the piston-armature assembly (i.e., moving component) and stator (i.e., stationary component) is maintained with a pre-determined value.

Without any compensatory means in place, the mechanical quality factor (Q) associated with the fundamental resonance of the combined piston-armature assembly can be unacceptably high and necessitates the need for a hand-limited velocity feedback control system to substantially reduce the Q. In this way, the dynamic motion of the piston-armature assembly (and hence the dynamic range of the projector) is kept within reasonable limits and the phase response through resonance does not exhibit a discontinuity. The feedback signal is derived from the difference between the output of an accelerometer positioned on the piston-armature assembly and an accelerometer positioned on the stator. Prior to the differencing step each accelerometer signal is integrated in time to convert acceleration to velocity. After these initial steps are complete, the measured signal is passed to the controller where it is combined with a control signal to drive the transducer at the input stage of a power amplifier which resides in the tow body. The difference between these two signals provides additional damping in the resonance region of the device. It also provides a degree of harmonic distortion control for spectral components that fall within control bandwidth of the system.

The control system architecture for the transducer employed by the projector also comprises an adaptive, in-line, compensation filter. This filter controls the overall gain and modest irregularities in the transfer function between the waveform generator voltage output and radiating piston acceleration for purposes of output waveform fidelity and accurate level control, repeatability, and close consistency between the pistons in any given unit and among multiple units employed by the transmit array. Further, the adaptive compensation filter ensures that the far-field radiated signal from the array is substantially equivalent to the superposition of all array elements operating in phase with the same source strength. Alternatively, the adaptive compensation filter can also be used to weight the magnitude and phase response of each projector to achieve a desired directivity pattern.

The exemplary adaptive compensation filter comprises two cascaded filter components: (1) an all-pass, unity magnitude response, frequency dependent phase modification infinite impulse response (IIR) filter, and (2) a finite impulse response (FIR) filter with tap coefficients computed to minimize the mean square error associated with the difference between the actual and ideal piston velocity, over the frequency range of interest. The actual (i.e., absolute) piston velocity is derived from the difference between an accelerometer located on the piston-armature assembly and an accelerometer located on the stator. The ideal piston velocity is a control signal (i.e., a command) that is transmitted from the survey vessel to the projector. The output of the compensation filter is combined with that of the velocity feedback controller at the input stage of the power amplifier that is used to drive the transducer. The entire control system is implemented and monitored by the computer positioned in the tow body.

Notwithstanding the foregoing, if the magnitude and particularly the phase between the piston and the signal emanating from the power amplifier are not sufficiently controlled by the above described adaptive compensation and velocity feedback methods, then in addition, servo-follower control can optionally be applied to improve waveform fidelity. Servo-follower control will also make a spatially distributed array of projectors more robust to any deleterious effects from the mutual radiation impedance (i.e., source coupling) between array elements.

The tow body is equipped with hydrodynamic control surfaces to change the submergence depth of the projector and maintain proper roll angle. Marine seismic surveys are typically performed at depths on the order of 1 to 10 m, so changing the depth of the projector on a command-actuated basis provides a large degree of system flexibility. In addition, ensuring that the tow body exhibits zero roll angle (i.e., the tow body is required to have little to no angular offset about the towing axis such that the force vector associated with the piston-armature assembly is substantially parallel to the air-water interface) forces the piston-armature assembly to be held level while it is towed. This is done so that the Earth's gravity cannot cause the pistons to statically deflect from their neutral position which is generally controlled by balancing the internal and external static pressure as well as applying a DC bias to the drive coils. The static positioning system mentioned earlier for the piston-armature assembly also works in concert with the hydrodynamic control surfaces to correct for any deflection of the piston-armature assembly that results from a slight static or dynamic perturbation in the tow body's roll-attitude.

Depth-changing commands from the survey vessel are input to a feedback control system that actuates drive motors that move the control surfaces so that they change the depth of the tow body. The exemplary control system, which is implemented and monitored by the computer positioned in the tow body, monitors the submergence depth using an externally located pressure sensor and adjusts the position of the control surfaces accordingly until the desired depth is achieved and maintained. The same control system architecture is used to maintain proper roll angle in which an omnipresent command of zero roll angle is transmitted from the survey vessel to the projector and compared against the measured roll angle using a orientation sensor located within the tow body. The control surfaces are actuated by the feedback control system until the difference between the commanded roll angle and that inferred from the orientation sensor is zero. Here it is noted that the tow body is equipped with a keel (i.e., the tow body is designed to have the center-of-buoyancy at a higher elevation point than the center-of-gravity) which provides a righting moment to maintain zero roll angle. The hydrodynamic control surfaces used in conjunction with the feedback control system are employed to provide additional reinforcement to the keel and in particular to actively damp-out roll oscillations and dynamic perturbations in shorter time intervals than would otherwise occur if the keel were used alone.

As mentioned earlier, the projector relies on a moving armature force generator as the principal transduction means which drives a back-to-back (i.e., symmetrical) arrangement of pistons with a time-harmonic signal to radiate sound. Unlike conventional techniques, the moving armature force generator associated with aspects of the present invention relies on a novel magnetic circuit design that is suited for the symmetrical piston arrangement. The disclosed magnetic circuit design consolidates four so-called E-shaped laminated structures into one monolithic laminated structure known as the central lamination circuit, or stator.

The arrangement of E-shaped laminated structures is symmetrical about the geometric center of the central lamination circuit thereby employing magnetic symmetry associated with the AC and DC magnetic flux which is provided by four windings and four permanent magnets. The AC magnetic flux is generated when the windings are energized with a time-harmonic current provided by a power amplifier. The direction in which the magnetic flux flows throughout the circuit depends on the manner in which windings are wrapped as well as the phasing of the AC signal. The DC magnetic flux is generated by the permanent magnets with a direction that depends on the physical orientation and polarity of the magnets.

The magnetic circuit also comprises an inner lamination pole, which is analogous to the I-shaped laminated structure associated with prior techniques. The inner lamination pole constitutes the armature and is outfitted with a linear drive shaft and bearings that are physically supported by the central lamination circuit or some intermediate structure. Here it is noted that the term linear drive shaft implies rectilinear motion of the moving armature assembly. The transducer is equipped with two inner lamination poles which in turn are each connected to a piston via the drive shaft. The inner lamination pole along with the permanent magnets and windings are strategically placed within the open spaces of the central lamination circuit to provide an efficient and effective path for the AC and DC magnetic flux to flow (viz., these components have exceedingly low reluctance, low eddy current losses, and have a low degree of fringing). The phasing of AC and DC magnetic flux creates a force gradient in the physical gaps that reside between the central lamination circuit and the inner lamination pole which in turn causes the armature assemblies to displace from their neutral position and impart dynamic forces to their respective pistons. Here it is noted that the windings and magnets are symmetrically positioned around the inner lamination pole (i.e., armature) in an effort to produce balanced forces as it undergoes oscillatory motion. This is done so that the mechanical motion of the armature is a direct analog of the waveform that is applied to the winding. In this way a low-degree of harmonic distortion is facilitated.

The foregoing can be illustrated in mathematical terms in order to provide further clarification of the underlying physics associated with the transduction mechanism. For this example, only half of the magnetic circuit needs to be analyzed since the transducer employs symmetry. Now then, for an electromagnetic (i.e., variable reluctance) transducer employing an air gap between two magnetic poles, the force in the air gap is $F=\Phi^2/2\mu_0 A$, where $\Phi$ is the magnetic flux, $\mu_0$ is the magnetic permeability of free-space, and A is the average area of the gap normal to the central flux line through the gap. This equation states that the force is a nonlinear function of the magnetic flux. For the transducer under consideration, the inner lamination pole is positioned in the central lamination circuit such that it has an air gap on either side. Moreover, because of the physical arrangement of the winding, permanent magnets, and inner lamination pole within the central lamination circuit, one of the air gaps has the AC and DC magnetic flux flowing in the same direction and the other has the AC and DC magnetic flux flowing in opposite directions. The superposition of AC and DC magnetic flux that flow throughout the circuit translates into a force gradient that is imposed on the inner lamination pole. This can be expressed mathematically as $F=[(\Phi_{DC}+\Phi_{AC})^2-(\Phi_{DC}-\Phi_{AC})^2]/2\mu_0 A$, where $\Phi_{AC}$ and $\Phi_{DC}$ are the AC and DC magnetic flux, respectively. Here, the terms in the parenthesis represent the magnetic flux associated with each air gap. Moreover, the equation can be simplified to become $F=2\Phi_{AC}\Phi_{DC}/\mu_0 A$, which states that the force is linear with the AC and DC magnetic flux. Further, because the magnetic flux and magnetic field are related by $\Phi=BA$, where B is the magnetic field, the force on the inner lamination pole can be expressed as $F=2AB_{AC}B_{DC}/\mu_0$. Finally, to first order, from Ampere's Law the magnetic field B coupled by a wire is proportional to the current I flowing through the wire. This indicates that the magnetic force imposed on the inner lamination pole and hence the piston-armature assembly is linear with the AC current applied to the winding from the power amplifier. This design feature is a critical enabler of the technology to produce high, linear force output per unit volume of transduction material.

The geometry of the poles associated with the stator and armature can be tailored to enhance the performance of the projector. This is particularly important considering that the restoring force associated with the magnetic spring that exists between the poles is positive and nonlinear. That is, under normal operating conditions, the net restoring force on the piston-armature assembly is largely dependent on the magnetic spring associated with the poles, the mechanical spring associated with the compliant suspension, and the acoustic spring associated with the pressurized gas contained within the housing. The net restoring force can be expressed as $F_{net}=F_{mag}-F_{mech}-F_{acs}$, where $F_{mag}$ is the restoring force associated with the magnetic spring, $F_{mech}$ is the restoring force associated with the mechanical spring, and $F_{acs}$ is the restoring force associated with the acoustic spring. If a situation arises where net restoring force is greater than or equal to zero, then the operation of the projector can become unstable and result in armature lock-up (i.e., the magnetic restoring force between the poles will lock the armature and stator together). This situation is exacerbated by the notion that restoring force associated with the magnetic spring is nonlinear and inversely proportional to the separation distance between the poles, meaning that the magnetic restoring force is greatest when the physical excursion of the armature is the greatest.

In the context of requiring the piston to undergo relatively large displacements to generate high-amplitude low-frequency sound in water, it is desirable to minimize the restoring force associated with the magnetic spring to the extent practical. This can be accomplished by tapering the poles associated with the armature and stator in lieu of using a square geometry. That is, in typical variable reluctance magnetic circuit designs, the pole geometry is square and therefore results in a relatively high restoring force from the magnetic spring as a result of the magnetic flux vector associated with the poles being collinear with the displacement vector associated with the armature. When the poles are tapered a percentage of the magnetic flux vector is directed perpendicular the displacement vector which lowers the restoring force associated with the magnetic spring. For related reasons the magnetic spring stiffness stays linear over a larger range of armature displacements resulting in a lower degree of harmonic distortion, particularly at low-frequencies. Here it is noted that for this concept to work properly the pole pairs contain matching taper geometries that loosely resemble that of a tapered finger joint commonly used in woodworking. This will be readily apparent upon inspection of the figures which present details of the pole geometry.

The magnetic material employed by the central lamination circuit (i.e., stator) and inner lamination pole (i.e., armature) can be tailored to meet certain design objectives. While numerous magnetic materials are available for use, silicon-based and cobalt-based steels are good candidates for the force generator disclosed herein. Grain-oriented silicon-steel having a content of 3.0 to 3.5% silicon is favored for the laminations when cost, eddy-current losses, fringing effects, and other parameters are considered. A typical formulation that meets this stoichiometric criterion is known as M6 steel. Conversely, when lamination weight and/or armature driving force (i.e., blocked force) are considered, cobalt-steel having a content of 48 to 50% cobalt is preferred. Alloys of this type are recognized under trade names such as Hiperco®, Permendur®, Vacoflux®, and Vacodur®. Further, the performance upgrade that is achievable with these alloys is tied to their magnetic saturation point, which is 2.4 T for Hiperco 50® as opposed to 1.6 T for M6 steel. The higher saturation point of Hiperco 50® permits greater drive currents that can be applied to the coil which results in a proportional increase in the force that is applied to the armature. It follows from this that for a given force rating, the physical size and weight of force generators made from Hiperco 50® will be smaller than those made from M6 steel, which is an attractive feature given that projector disclosed herein is deployed from a survey vessel.

The formulation associated with the permanent magnets can be tailored to enhance the performance of the projector with emphasis on minimizing its size and weight. Rare Earth magnets such as Neodymium-Iron-Boron and Samarium-Cobalt have advantages over conventional magnets like Alnico and Ferrite given that their energy density, as defined by parameter $(BH)_{max}$, where B is the magnetic flux density and H is magnetic field strength, is typically an order of magnitude higher. This results in compact, light-weight magnets which help minimize the overall size and weight of the projector.

The wire gauge utilized by the drive coil along with the geometry of its cross-section can be tailored to minimize its contribution to the overall size and weight of the projector as well as minimize thermal losses. In order to appreciate this, it is instructive to note the difference between force generators that rely on the electromagnetic versus electrodynamic transduction principals. In the case of the former the drive coil is typically fixed to the stator, whereas in the case of the latter the drive coil is typically fixed to the armature (viz., the so-called voice coil). When the coil is fixed to the stator, relatively few turns of large gauge wire can be used which results in relatively low electrical resistance and thermal losses. Conversely, when the coil is fixed to the armature, comparatively greater numbers of turns of considerably smaller gauge wire are required which results in relatively high electrical resistance and thermal losses. Further, the armature takes on the weight penalty of the coil which in turn impacts the force requirements associated with the magnetic circuit. Lastly, the packing-factor associated with aforementioned large gauge wire can be optimized by employing a rectangular cross-section (i.e., wire that resembles a ribbon) as opposed to circular. Drive coils that exhibit a relatively high packing-factor contribute positively to minimize the overall size and weight of the projector.

FIG. 1 presents an elevation drawing that shows the overall concept of using a coherent sound source in marine seismic survey 100 that is representative of an exemplary embodiment of the present invention. Survey vessel 110 tows fully-integrated array 120 comprising sound projectors 121 using load-bearing umbilical 122 below the water surface 130. The physical spacing between the projectors 123 is d which is typically no greater than half an acoustic wavelength at the highest frequency of interest. When the array elements are energized with a time-harmonic signal they generate compressional wave 140 that propagates through water column 150 and is incident on the multilayered media that makes up seafloor 160. The compressional wave is transmitted into the layered media as a series of dilatational waves 170 and 180 and eventually returns to the seawater as compressional wave 190 which is sensed by a receiving array (not shown in the figure). Here it is noted that the sound propagation physics described here are highly simplified for reasons of clarity and brevity and does not delve into the concept of shear wave production and reflections at each layer.

Figure 2:
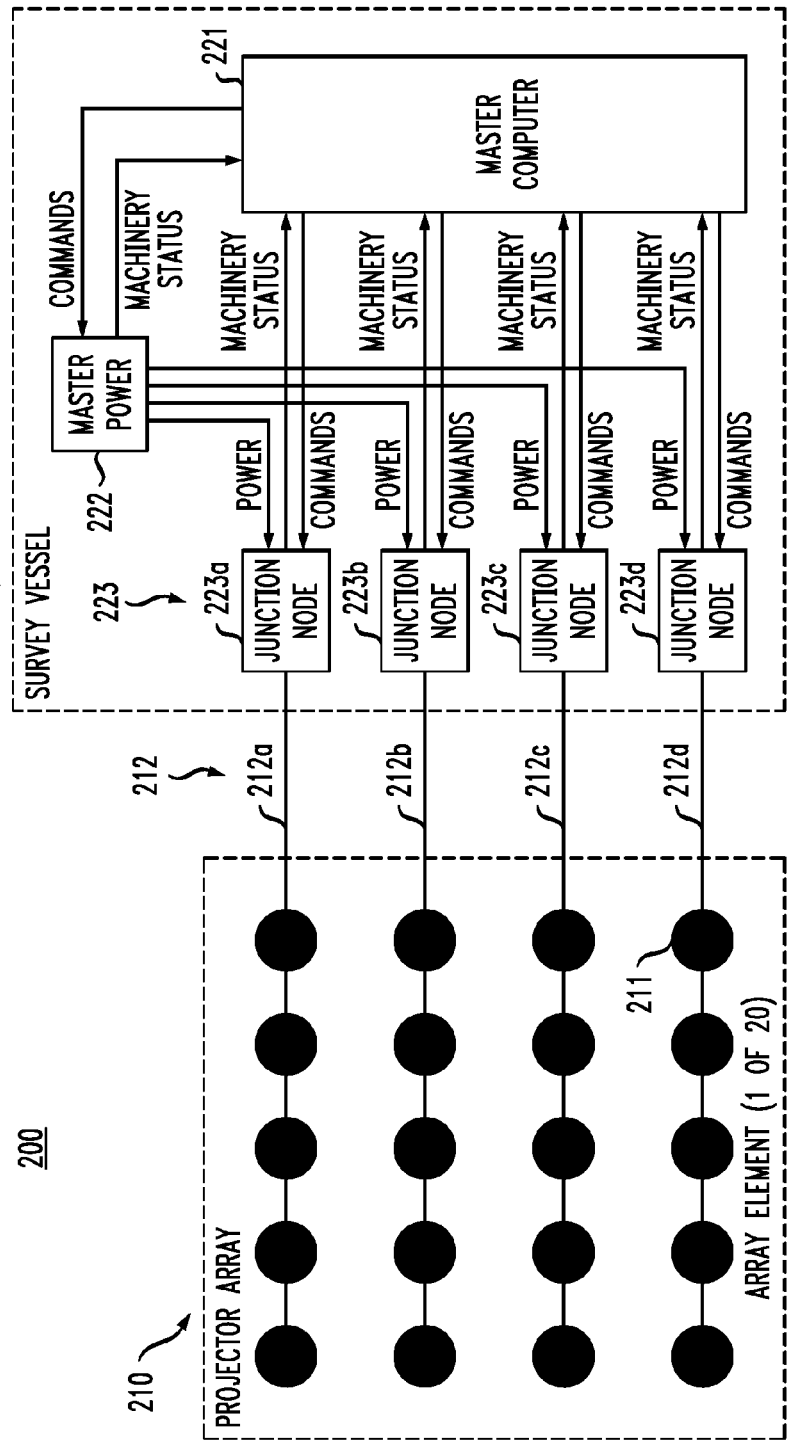
FIG. 2 presents a system diagram showing the overall functionality of an exemplary embodiment of the present invention.

FIG. 2 presents system diagram 200 which shows the overall functionality of the system that is representative of an exemplary embodiment of the present invention. It is merely an example configuration designed to show a hypothetical arrangement of the array, major components used to control the array, and the associated paths of electrical power and data (e.g., commands and machinery status). System diagram 200 is split into two major subsystems comprising components associated with projector array 210 and survey vessel 220. Projector array 210 is a planar configuration of 20—elements arranged in 4-rows and 5-columns. Each projector 211 is a fully-integrated device containing transduction means, system electronics, hydrostatic pressure compensation means, static positioning means for the piston-armature assembly, and hydrodynamic control surfaces that are explained in subsequent figures. The elements of each row are connected to each other and to survey vessel 220 using load-bearing umbilical 212. Here umbilical 212 is the means by which each row of projectors is towed from survey vessel 220 and the means by which electrical power, compressed air, and data (e.g., commands and machinery status) are transmitted. The principal components aboard survey vessel 220 include master computer 221 which serves as the central control authority for the entire system, master power supply 222 which supplies electrical power to the array, and junction nodes 223 which serve as a physical and electrical connection for umbilicals 212. For this example, the system is configured with four junction nodes 223a, 223b, 223c, and 223d, which serve as the connection point for umbilicals 212a, 212b, 212c, and 212d.

Figure 3:
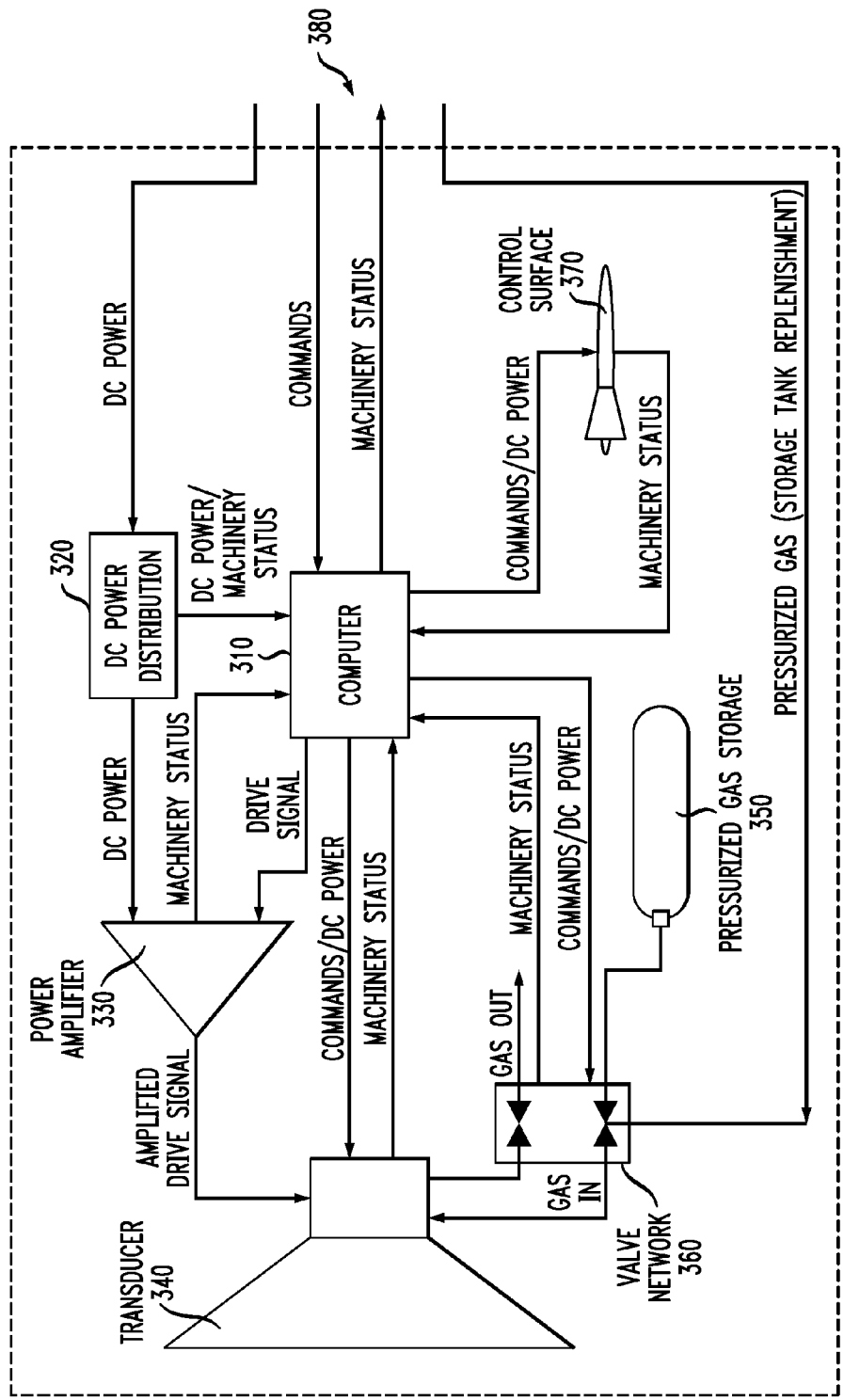
FIG. 3 presents a system diagram summarizing the functionality of a single projector associated with an exemplary embodiment of the present invention.

FIG. 3 presents system diagram 300 that summarizes the functionality of a single integrated projector node that is representative of an exemplary embodiment of the present invention. A simplified diagram is presented which excludes redundant components for the sake of brevity and clarity. The principal components associated with the projector are computer 310 which serves as the local control authority for the system, DC power distribution circuit 320 which regulates and distributes power received from the survey vessel of FIG. 2, power amplifier 330 which drives transducer 340 with the requisite coherent waveform needed for the survey and provides a DC bias to facilitate static positional adjustments of the piston-armature assembly, pressurized gas tank 350 and valve network 360 to provide hydrostatic pressure compensation to transducer 340, and control surface 370 which provides the means to change the depth of the projector and maintain the proper roll angle as it is towed. Umbilical 380 is used to transmit electrical power, pressurized gas, and data (e.g., commands and machinery status) between the survey vessel of FIG. 2 and the integrated projector shown in FIG. 3. The pressurized gas supplied by the survey vessel is principally used to replenish the gas in the storage tank, however, it is possible to configure the valve network so that gas from the survey vessel is supplied directly to the projector.

Figure 4:
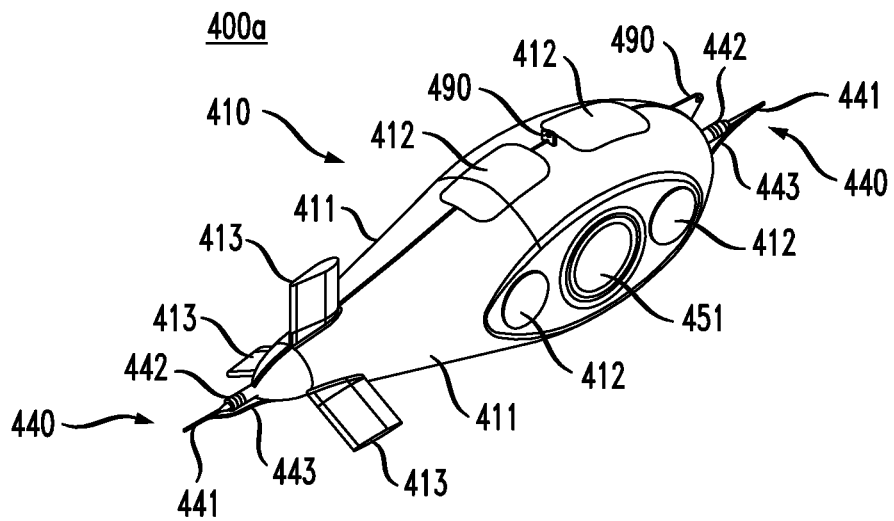
FIG. 4 presents fully-assembled and exploded isometric views showing the fully-integrated projector associated with an exemplary embodiment of the present invention.
Figure 4:
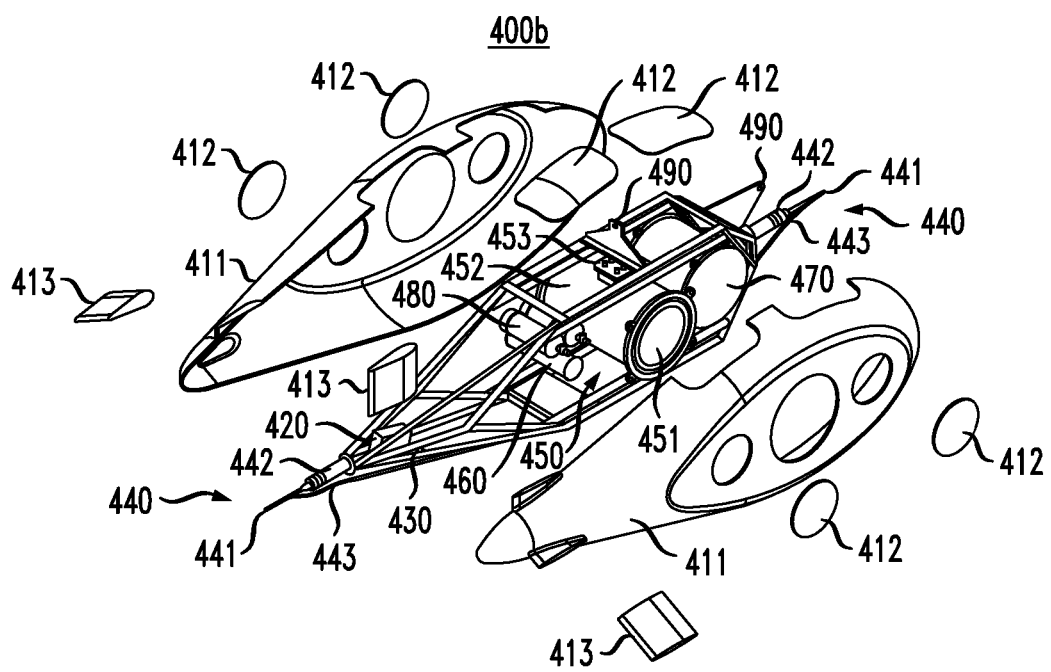

FIG. 4 presents fully-assembled and exploded isometric views 400a and 400b showing the fully-integrated projector node that is representative of an exemplary embodiment of the present invention. The projector employs a hydrodynamically shaped (i.e., low drag) tow body 410 comprised of two shells 411, a series of access ports 412, and a control surfaces 413. Access ports 412 are employed to facilitate repairs, perform preventive maintenance, etc. to the components residing within the tow-body. Control surfaces 413 provide means to change the depth of the tow body and maintain the proper roll angle as it is towed. The position of control surfaces 413 is adjusted by the computer controlled actuator 420. Tow body 410 is made from a structural plastic, is either fully or partially air-backed which facilitates near neutral buoyancy and provides space for skeletal frame 430 to serve as a mounting structure for the internal components and an attachment point for load-bearing umbilical 440. When the projector is towed all of the lowing forces are transmitted from umbilical 440 to frame 430. Umbilical 440 is further comprised of integrated cable assembly 441, connector 442, and safety line 443 to prevent loss of the tow body in the event a failure occurs in cable 441 or connector 442. Integrated cable assembly 441 contains a strength member, electrical conductors, fiber optic telemetry link, and gas hose. Principal transduction means 450 is positioned at or near the center-of-gravity of the tow body and comprises a back-to-back (i.e., symmetrical) arrangement of pistons 451 which are mechanically driven by a moving armature force generator contained within cylindrical housing 452. The pistons are compliantly suspended and sealed in a water-tight fashion, and are appropriately sized to preclude cavitation. Patch panel 453 serves as the system interface between the transducer and the other equipment within the node which includes a suite of computer controlled electronics contained in cylindrical housing 460, a DC power distribution system and two-channel power amplifier contained in cylindrical housing 470, and pressure compensation means 480 comprising high-pressure gas storage tanks and valve network. The computer has local control authority over all the components within the integrated projector but receives commands from master computer aboard the survey vessel in FIG. 2. Lifting eyes 490 are utilized for the purpose of transporting and deploying the projector without imparting point loads to the tow-body. The forces applied to lifting eyes 490 are transmitted to frame 430. Though not shown in FIG. 4, an alternative tow body material is solid blocks of syntactic foam or closed cell foam to minimize any potentially deleterious effects from the approximate pressure-release boundary condition the tow body presents to the acoustic field radiated by pistons 451. Moreover, the foam blocks would be molded or machined in an appropriate manner to accommodate all the interior components and may necessitate a more simplified design of frame 430 since the foam has a fair amount of structural rigidity.

Figure 5:
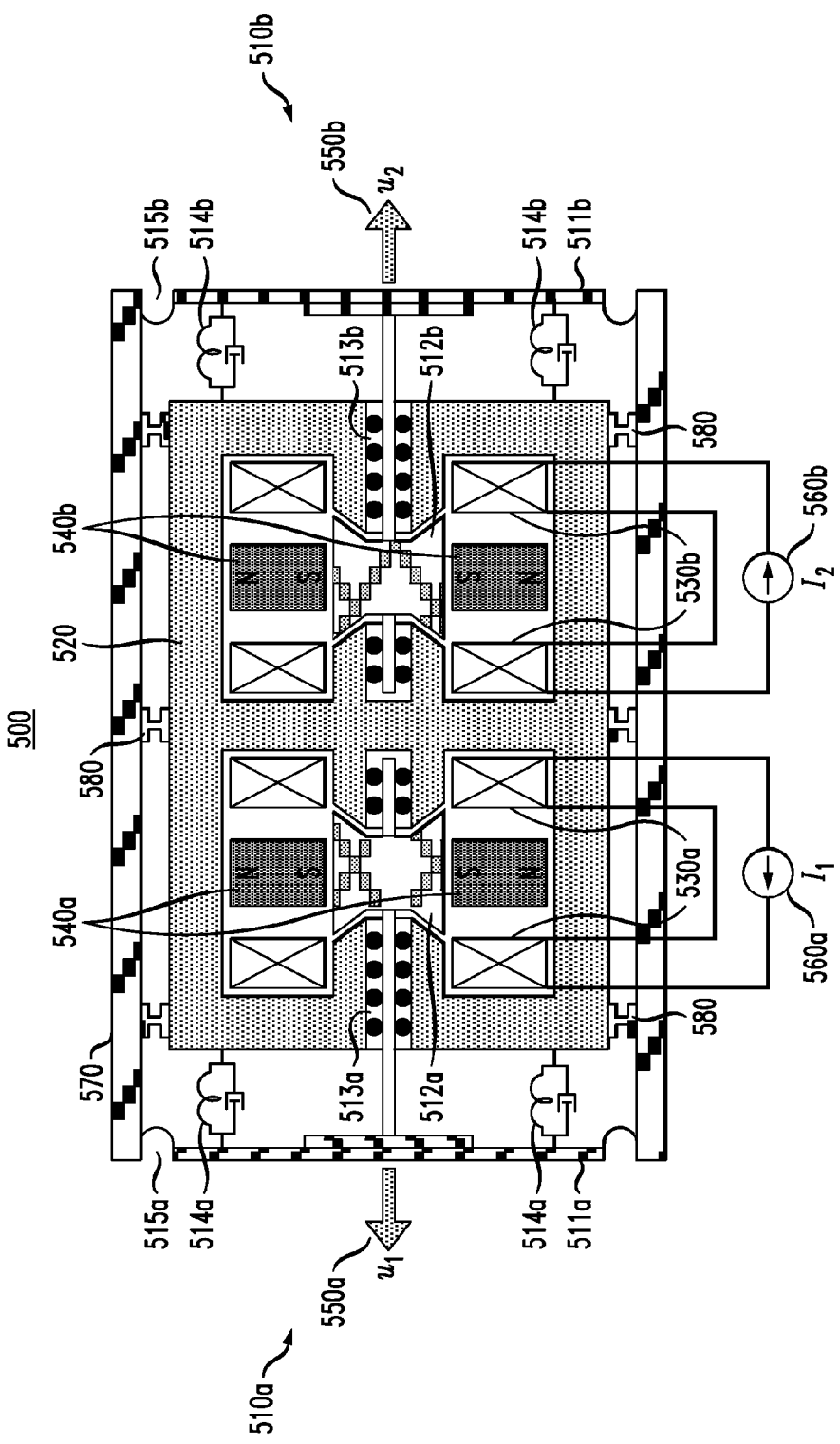
FIG. 5 presents a functional section view of the principal transduction means associated with the fully-integrated projector associated with an exemplary embodiment of the present invention.

FIG. 5 presents a functional section view of principal transduction means 500 associated with the fully-integrated projector node shown in FIG. 3 and FIG. 4 that is representative of an exemplary embodiment of the present invention. A back-to-back arrangement of piston-armature assemblies 510a and 510b are positioned around the framework of central lamination circuit (i.e., stator) 520. Piston-armature assemblies 510a and 510b are further comprised of plane circular pistons 511a and 511b, inner lamination poles (i.e., armatures) 512a and 512b, linear drive shaft/bearing assemblies 513a and 513b, damped mechanical suspension springs 514a and 514b, and rolling element seals 515a and 515b. The symmetry inherent with the back-to-back arrangement of piston-armature assemblies 510a and 510b is intended to result in a virtual node located at the geometric center of the central lamination circuit 520 thereby providing an acceleration canceling feature which obviates the need for a reaction mass, substantially lowers the 3 overall mass of the projector, and ensures that the device exhibits monopole, as opposed to dipole, directivity characteristics. Pistons 511a and 511b are appropriately sized to preclude cavitation, wherein the dynamic pressure radiated from the active face is substantially lower than the static pressure associated with seawater submergence. Further, pistons 511a and 511b employ a high strength-to-weight material with significant mechanical loss factor to ensure that the active radiating surfaces have their first flexural resonance well-above the highest frequency of interest and provide a sufficient level of damping to ensure that any resonant modes that are present do not appreciably amplify any out of band noise (i.e., harmonic distortion). Electrical coils (i.e., windings) 530a and 530b and permanent magnets 540a and 540b are strategically positioned within the open spaces of central lamination circuit 520 in pairs such that they have a symmetrical arrangement about their respective inner lamination pole (i.e., armature) 512a and 512b. The physical symmetry translates into electromagnetic symmetry and results in piston velocities 550a and 550b that are a direct analog of electrical currents 560a and 560b which are applied to coils 530a and 530b. This arrangement facilitates a low-degree of harmonic distortion. Cylindrical shell 570 is used to house the transducer and contains ribs (or some equivalent means) 580 to both stiffen the shell and serve as a mounting location for central lamination circuit 520.

Figure 6:
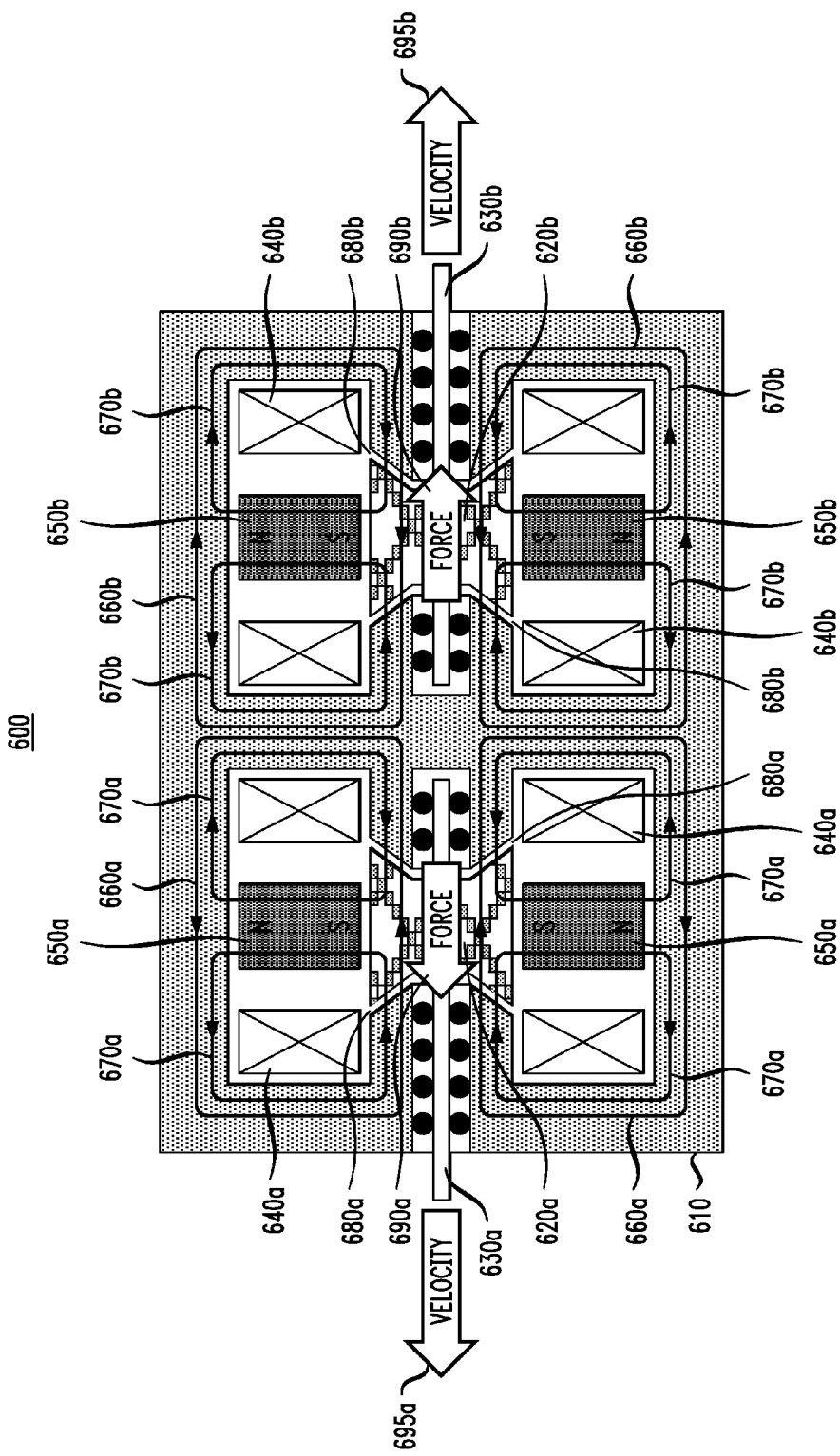
FIG. 6 presents a diagram showing how the principal transduction means converts magnetic flux to mechanical force and velocity for an exemplary embodiment of the present invention.

FIG. 6 presents diagram 600 showing how the principal transduction means converts the AC and DC magnetic flux to dynamic force and velocity that is representative of an exemplary embodiment of the present invention. The force generator consists of central lamination circuit (i.e., stator) 610, inner lamination poles (i.e., armatures) 620a and 620b, linear drive shaft/bearing assemblies 630a and 630b, windings 640a and 640b, and permanent magnets 650a and 650b. Note, the descriptors 'a' and 'b' in the labeling nomenclature are indicative of the left- and right-sides of the transducer. The components labeled with 'a' and 'b' are identical which in turn translates to force symmetry about the geometric center of central lamination circuit 610 thereby making it a mechanically grounded structure and hence becomes a virtual acceleration cancelling node. AC magnetic flux 660a and 660b are generated when windings 640a and 640b are energized with a time-harmonic AC signal. The direction of magnetic flux 660a and 660b depends on the manner in which windings 640a and 640b are wrapped around central lamination circuit 610 as well as the phasing of the AC signal. DC magnetic flux 670$8 and 670b are generated by magnets 650a and 650b with a direction that depends on the physical orientation and polarity of the magnets. The phasing of AC and DC magnetic flux 660a, 660b, 670a and 670b creates a force gradient in gaps 680a and 680b which in turn causes the armature assemblies to displace from their neutral position with dynamic forces 690a and 690b. These forces cause armatures 620, and 620b and linear drive shafts 630a and 630b to exhibit rectilinear motion with velocity 695a and 695b. Additional DC magnetic flux is generated when windings 640a and 640b are energized with a DC bias which results in a change in the static position of armatures 620a and 620b.

Figure 7:
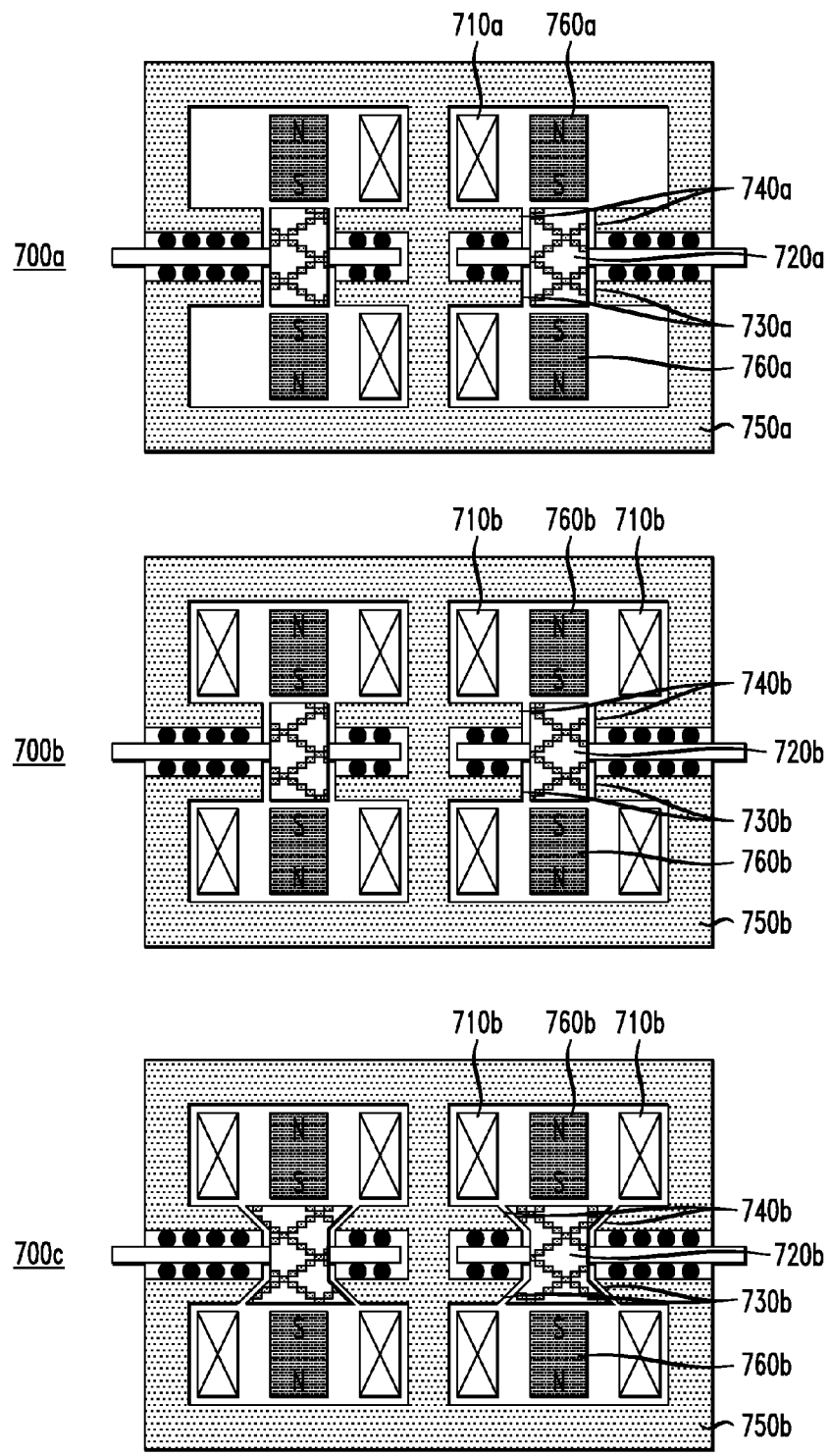
FIG. 7 presents diagrams which compare and contrast three different embodiments of the principal transduction means pursuant to the number electrical coils employed per armature and the geometry of the poles associated with the magnetic circuit.

FIG. 7 presents diagrams 700a. 700b, and 700c which compare and contrast three different embodiments of the principal transduction means pursuant to the number of windings (i.e., electrical coils) employed per armature (i.e., inner lamination pole) and the geometry of the poles associated with the armature and stator (i.e., central lamination circuit). Diagram 700a shows an embodiment containing one winding 710a per armature 720a along with square pole geometries 730a and 740a for armature 720a and stator 750, respectively. Diagram 700b shows an embodiment containing two windings 710b per armature 720b along with square pole geometries 730b and 740b for armature 720b and stator 750b, respectively. Diagram 700c shows an embodiment containing two windings 710c per armature 720c along with tapered pole geometries 730c and 740e for armature 720c and stator 750c, respectively. Common to the embodiments depicted in diagrams 700a, 700b, and 700c are permanent magnets 760a, 760b, and 760c, respectively. Using two windings instead of one ensures that the mechanical force associated with the outward and inward strokes of the armature is a direct analog of the AC drive current that is applied to the winding. This is predicated upon arranging the windings and magnets in a symmetrical manner around the armature in paired assemblies. Using a tapered vice square pole geometry for the armature and stator reduces the degree of nonlinearity (and hence harmonic distortion) in the system and reduces the chance for armature lock-up. It is for these reasons that the embodiments disclosed in diagrams 700a, 700b, and 700c are ranked good, better, and best, respectively. Further, diagram 700c is considered to be representative of an exemplary embodiment of the present invention.

Figure 8:
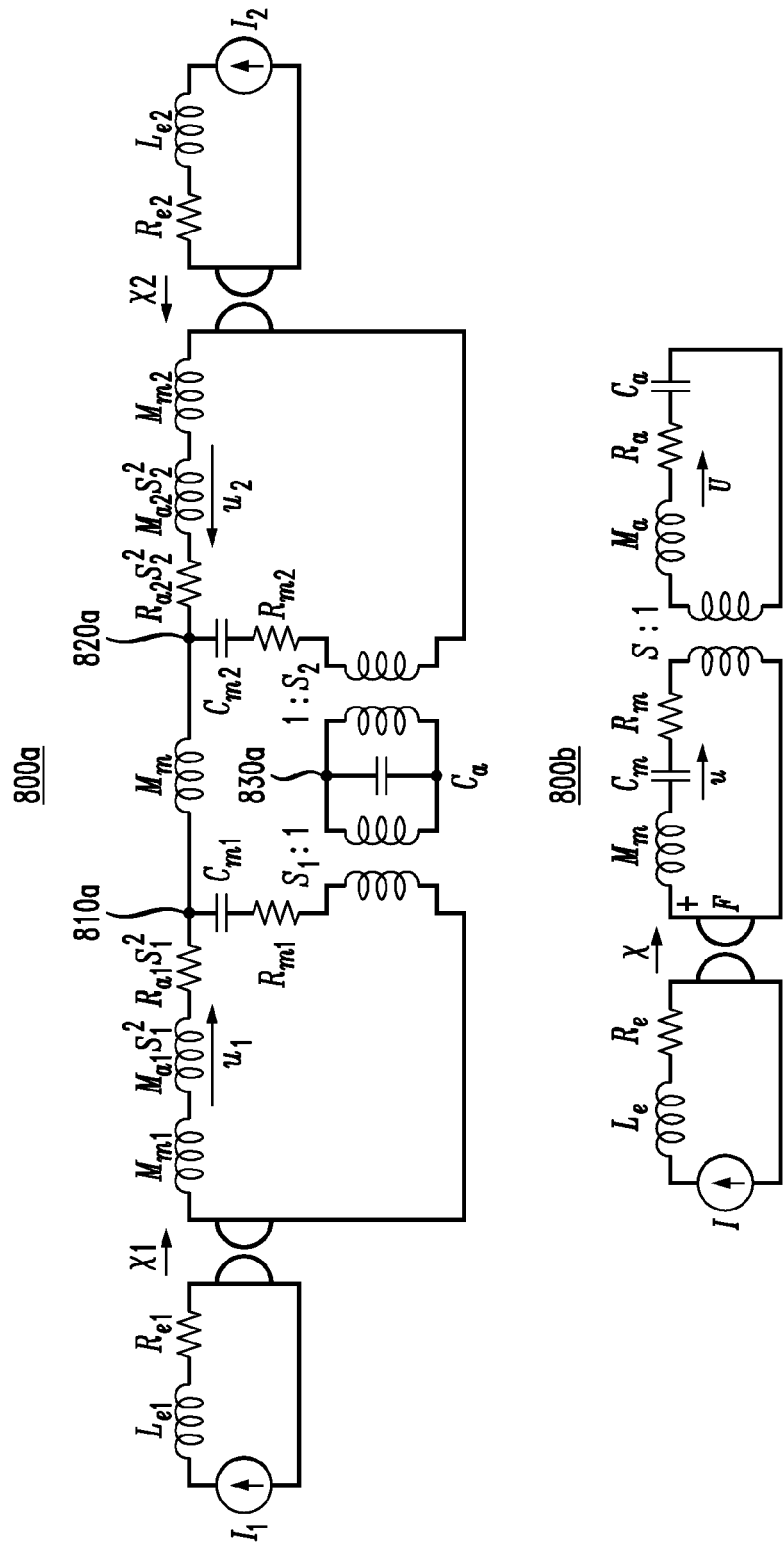
FIG. 8 presents lumped parameter circuit diagrams which are representative of an exemplary embodiment of the present invention.

FIG. 8 presents lumped parameter circuit diagrams 800a and 800b which are representative of an exemplary embodiment of the present invention, and in particular, the embodiment shown in FIG. 5. Circuit diagram 800a is a generalized representation of the projector for the case of back-to-back piston radiators having arbitrary size and driven by moving armature transducer assemblies that are not necessarily identical. In this representation the projector is radiating in free-space having 4π steradians. Further, lumped parameter circuit elements labeled with subscripts 1 and 2 are indicative of the first and second pistons and their associated moving armature transducer assemblies, respectively. Likewise, subscripts e, m, and a are illustrative of electrical, mechanical, and acoustical circuit elements, respectively. In diagram 800a the electrical and mechanical domains are coupled with ideal gyrators and the mechanical and acoustical domains are coupled using ideal transformers. In this generalized representation, the pistons and their associated moving armature transducer assemblies are physically coupled through the combined mechanical mass associated with the stator and housing as well as the acoustical compliance associated with pressure compensation gas contained within the housing. These circuit elements are denoted as $M_m$ and $C_a$ in diagram 800a. During operation of the projector, currents $I_1$ and $I_2$ are applied to the electrical coils associated with the first and second moving armature transducer assemblies, which causes velocities $u_1$ and $u_2$ to flow through the circuit and enter into junctions 810a and 820a, respectively. In the special case when the circuit elements with subscript 1 are substantially equal to the corresponding circuit elements with subscript 2 (or can be made to be substantially equal with the application of appropriately designed control system), velocities $u_1$ and $u_2$ are substantially equal and flow entirely into their respective shunted branches containing the transformers. In this way $M_m$ is effectively infinite and represents and open-circuit between junctions 810a and 820a. The open-circuit translates to the virtual node/acceleration canceling feature recited earlier in the patent. Further, with the open-circuit in place, diagram 800a exhibits symmetry about junction 830a such that the lumped parameter model of the projector can be represented by circuit diagram 800b. In this representation, the projector contains one piston and is radiating into half-space having 2π steradians. That is, generally speaking, a projector positioned in free-space that has a back-to-back arrangement of identical pistons having equal volume velocities is equivalent to a projector positioned in half-space that has a single piston with the same volume velocity. This greatly simplifies the analysis of the electroacoustic performance of the projector since closed-form analytical formulae are available for the acoustical radiation impedance of numerous baffled piston geometries. With regard to diagram 800b, the numerical subscripts are omitted for clarity since it is understood that the analysis pertains to one piston and its associated moving armature transducer assembly. Further, as evidenced by L. L. Beranek, *Acoustics* (Acoustical Society of America, Woodbury, N.Y., 1993) p. 223, incorporated by reference herein, the sound pressure radiated from a baffled piston is $p=(|U|^2 R_a D_f \rho_0 c/2\pi r^2)^{1/2}$, where U is the volume velocity flowing through the acoustic branch of the circuit, $R_a$ is the acoustical radiation impedance, $D_f$ is the directivity factor, $\rho_0$ and c are the density and sound speed of the surrounding fluid medium, and r is the radial distance from the center of the piston to the field point. From diagram 800b the volume velocity is found to be $U=\chi I/Z_{eqv}S$, where $\chi$ is the gyration constant, I is the current, $Z_{eqv}$ is the equivalent acoustic impedance associated with the motional branch of the lumped parameter network, and S is the surface area of the side of the piston in contact with the surrounding fluid medium. The equivalent acoustic impedance parameter is further defined as $Z_{eqv}=Z_m/S^2+Z_o$, where $Z_m=R_m+j\omega M_m+1/j\omega C_m$ is the mechanical impedance associated with the piston-armature assembly and where $Z_a=R_a+j\omega M_a+1/j\omega C_a$ is the acoustical impedance associated with sound radiation from the piston and the pressure compensation gas contained within the housing. In the foregoing equations, resistive, mass, and compliance parameters are denoted with symbols R, M, and C, respectively. Also, ω is the excitation frequency and $j=\sqrt{-1}$.

Figure 9:
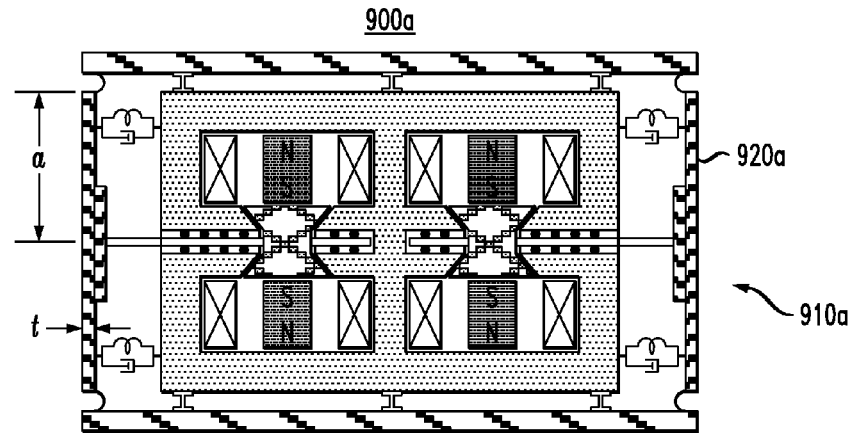
FIG. 9 presents diagrams which show the projector configured with plane, conical, and convex pistons.
Figure 9:
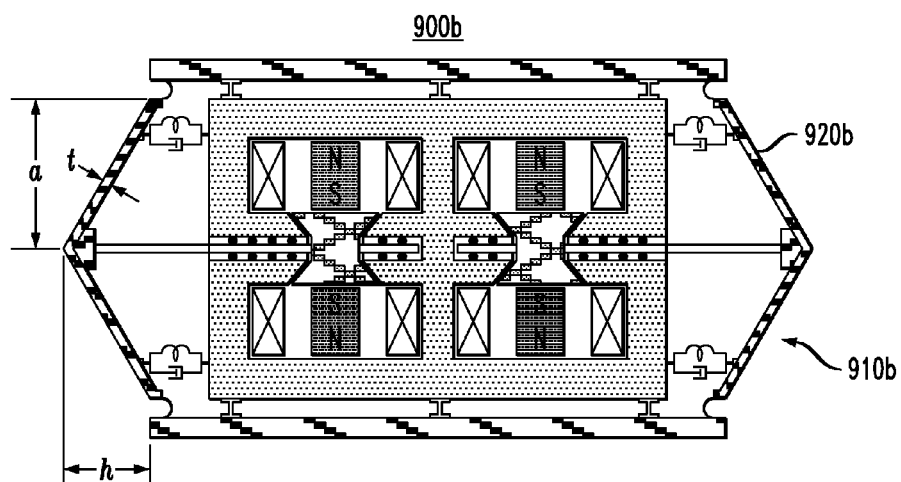
Figure 9:
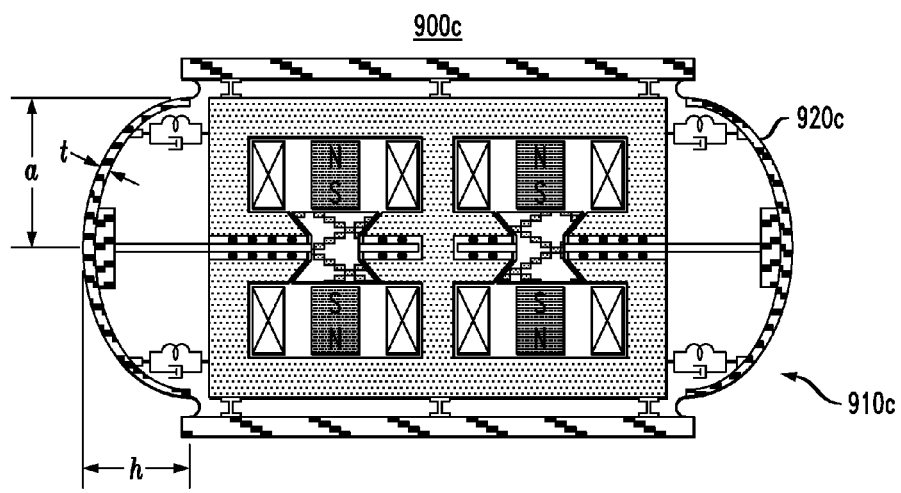

FIG. 9 presents diagrams 900a, 900b, and 900c which show the projector configured with different pistons. Diagram 900a shows that projector 910a employs an identical set of plane circular pistons 910a having radius a and thickness t. Diagram 900b shows that projector 910b employs an identical set of conical pistons 920b having radius a, height h, and thickness t. Diagram 900c shows that projector 910c employs an identical set of convex pistons 920e having radius a, height h, and thickness t. The choice of piston geometry depends on the optimization strategy for the projector. For example, reductions in the force necessary to drive the piston-armature assembly can be realized from analysis of circuit diagram 800b in FIG. 8. That is, for frequencies well-above the motional resonance, the driving force required to achieve a prescribed velocity (and hence a desired sound pressure level) is $F=j\omega(M_m+M_aS^2)u$. It follows from this that lowering the moving mass in the system will facilitate lower force requirements which has the potential to translate into lower stator mass and electrical power requirements. An exemplary method to lower the moving mass is to change the geometry of the piston because the radiation mass (i.e., $M_aS^2$) associated with the piston is typically very large for low-frequency sound projectors of this type. By way of example, finite element analysis was performed to determine the radiation mass of plane, conical, and convex pistons, each having a radius of 35.4 cm (13.9 in). The axial height of the conical and convex pistons was equal to the radius indicating that twice the opening angle of conical piston was 90° and the convex piston was a hemisphere. The results of the analysis indicate that the radiation mass was 119, 85.0 and 76.7 kg, for the plane, convex, and conical pistons, respectively. This translates into a 29% reduction in for plane versus conical pistons and a 36% reduction for plane versus convex pistons. Further, the values determined for the plane and convex pistons are consistent with analytical formulae presented in C. H. Sherman and J. L. Butler, *Transducers and Arrays for Underwater Sound* (Springer, New York, N.Y., 2007), pp. 463-465, 569 and H. Suzuki and J. Tichy, "Sound Radiation from Convex and Concave Domes in an Infinite Baffle," *J. Acoust. Soc. Am.*, 69(1), 41-49 (1981), each incorporated by reference herein. While these metrics are significant, they should be tempered by the notion that for a given radius and thickness, the mechanical mass of the plane piston is lower than that of the conical and convex pistons. However, the implication of this result is not expected to be an issue for practical piston designs. First, for moving armature projectors, the armature itself (and not the piston) is typically most significant component of the mechanical mass $M_m$. Second, since the bending rigidity of shells is significantly higher than that of plates of the same thickness, the thickness of conical and convex pistons will be less than that of a plane piston when their thickness is sized to ensure that the first flexural mode is well-above the frequency range of interest. Further, the finite element model was also used to evaluate the radiation resistance since this has a direct impact on the radiated sound pressure level. Results show that the radiation resistance for the piston geometries under consideration were virtually identical (i.e., they varied less than 1 dB) for frequencies below 500 Hz (i.e., when ka≤0.74, where k is the acoustic wavenumber). This suggests that the changes to the piston geometry will not adversely impact the source level given that the frequency range of interest is nominally 5 to 100 Hz. These results are generally consistent with the theory presented by Suzuki and Tichy for the case of plane versus convex pistons.

Figure 10:
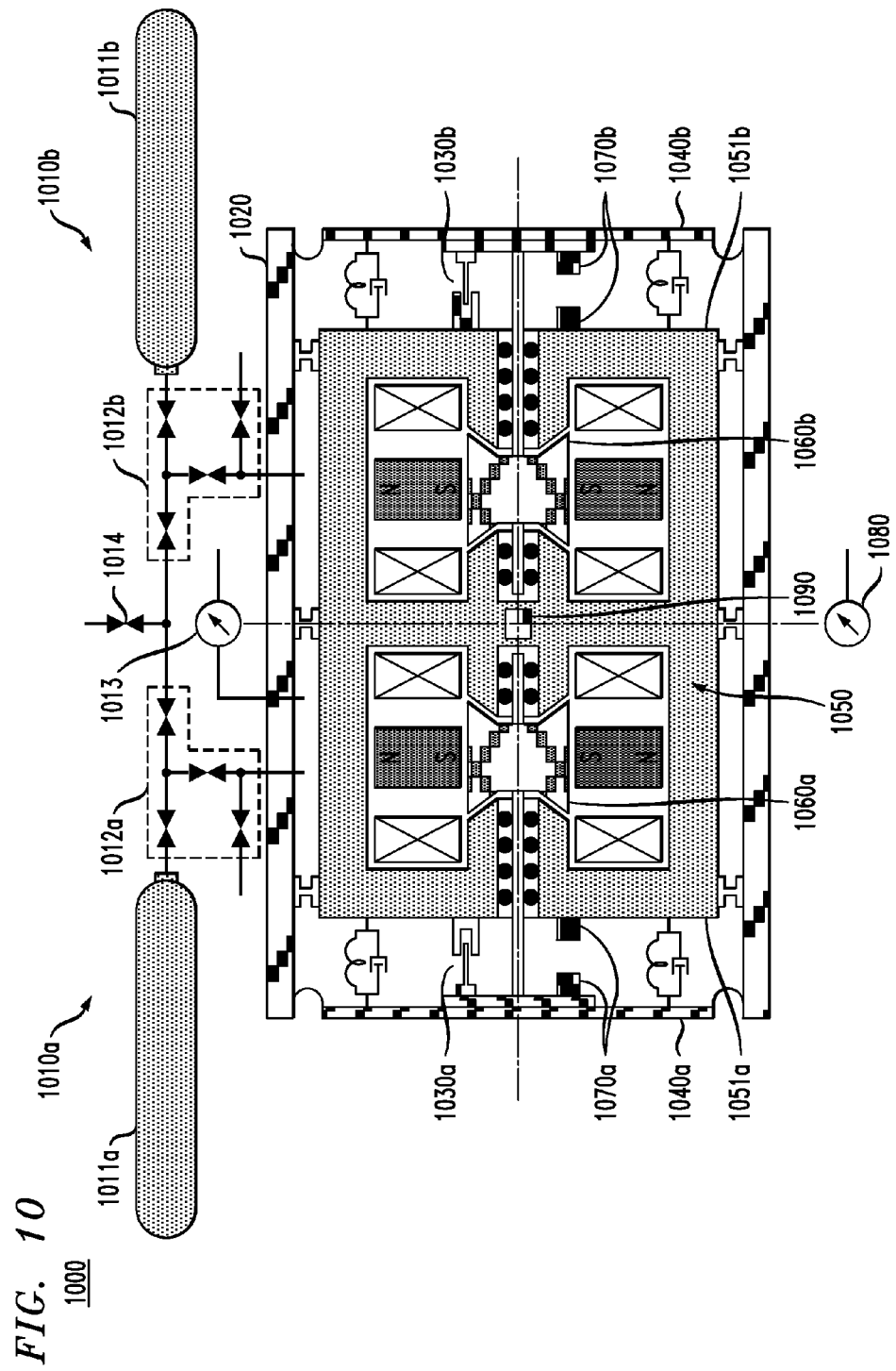
FIG. 10 presents a diagram which shows how the pressure compensation system is integrated into the projector and presents details of various engineering sensors that are utilized by the control system, said features are representative of an exemplary embodiment of the present invention.

FIG. 10 presents diagram 1000 which shows how the pressure compensation system is integrated into the projector and presents details of various engineering sensors that are utilized by the control system to adjust the pressure of the compensation gas contained within the housing, adjust the static position of the piston-armature assembly, optimize dynamic operation of the piston-armature assembly, change and maintain the depth of the projector, and maintain proper roll angle of the projector. These features are representative of an exemplary embodiment of the present invention and are presented as a precursor to the formal narrative and figures associated with the control system which are presented later on in this section.

The pressure compensation system is principally comprised of gas storage tank/valve network assemblies 1010a and 1010b. Storage tanks 1011a and 1011b admit pressurized gas into the interior space of housing 1020 via valve networks 1012a and 1012b. The same valve networks expel gas from the housing into the surrounding fluid medium. The control system determines whether to admit or expel gas in order to compensate the pistons and relies on data from differential pressure gauge 1013 to select the appropriate valve line-up. During normal operation, only one of the storage tank/valve network assemblies are in use. The other assembly is idle until the gas from the first is depleted. Changes are then made to valve networks 1012a and 1012b to bring the idle unit online and fill the purged unit with gas supplied from the survey vessel via valve 1014. This process repeats until the survey is complete. Here it is noted that having a source of pressurized gas local to the projector is considered to be advantageous since there may be latency issues if the gas were exclusively supplied from the survey vessel given that the umbilical has a length on the order of 1 km.

As shown in FIG. 10, proximity/positional sensors 1030a and 1030b are located in the space between pistons 1040a and 1040b and distal ends 1051a and 1051b of stator 1050, respectively. In this example, proximity/positional sensors 1030a and 1030b are LVDTs which are two-piece units that measure the static position of piston-armature assemblies 1060a and 1060b, respectively and serve as inputs to the control system to adjust the assemblies to their neutral position. During installation, one part of the LVDT is mounted on the piston and the other part is mounted on the distal end of the stator.

FIG. 10 also shows accelerometer pairs 1070a and 1070b which are used in connection with the control system to optimize dynamic operation of piston-armature assemblies 1060a and 1060b, respectively. For each pair, one accelerometer is mounted to the piston and the other is mounted on the distal end of the stator. The difference between the accelerometer signals provides an estimate of the absolute acceleration of the piston-armature assembly. This step may be required in the event slight motion is evident in the stator as a result of imperfectly matched pistons and their associated moving armature transducer assemblies.

Lastly. FIG. 10 shows depth sensor 1080 and orientation sensor 1090 which are used to provide inputs to the control system to adjust the depth of the projector and maintain proper roll attitude. Depth sensor 1080 relies on the static pressure in the surrounding fluid medium to infer the depth of the projector. The location of depth sensor 1080 is external to housing 1020 at a known elevation relative to the center of pistons 1040a and 1040b. Orientation sensor 1090 is located at the geometric center of projector or at some known position relative to the geometric center of the projector.

Figure 11:
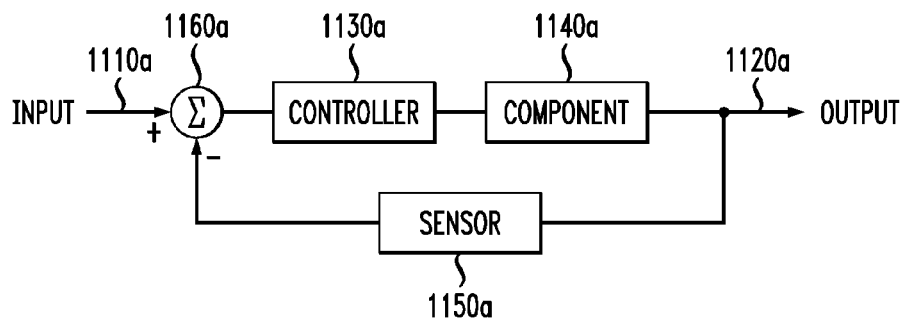
FIG. 11 presents diagrams showing the control system architecture for the fully-integrated projector associated with an exemplary embodiment of the present invention.
Figure 11:
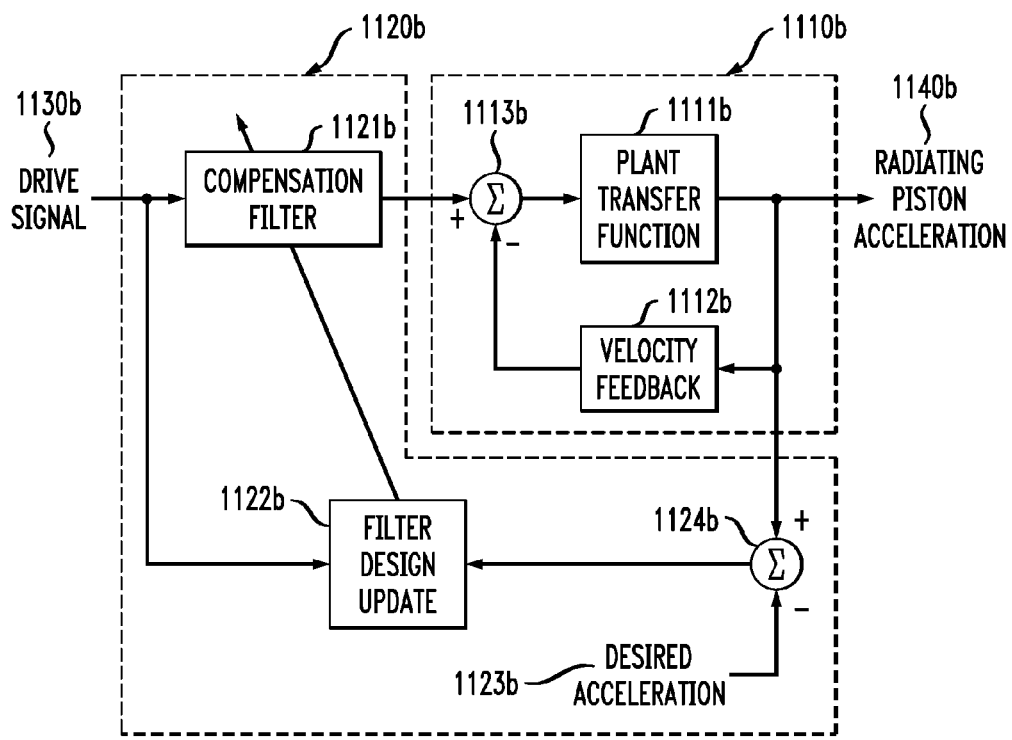

FIG. 11 presents diagrams 1100a and 1100b which show the control system architecture for the fully-integrated projector that is representative of an exemplary embodiment of the present invention. Diagram 1100a presents the architecture for pressure compensation, static position control of the piston-armature assembly, and control surface actuation, whereas diagram 1100b presents the architecture for high-fidelity operation of the transducer. With regard to diagram 1100a, a feedback control architecture is employed consisting of input 1110a, output 1120a, feedback controller 1130a, the component being controlled 1140a, monitoring sensor 1150a, and summing block 1160a.

For the case of the pressure compensation system, input 1110a, output 1120a, component 1140a, and sensor 1150a correspond to the signal from an external pressure sensor, regulated air pressure applied to the driving piston, valve network, and the signal from an internal pressure sensor, respectively. The driving piston is pressure compensated when the difference between the internal and external pressure sensors is either zero or meets some user-defined threshold. The differencing operation is computed by summing block 1160a. Here it is noted that for all intents and purposes practical implementation of the internal and external pressure sensors is accomplished through a differential pressure sensor as shown in FIG. 10.

For the case of adjusting the static position of the piston-armature assembly, input 1110a, output 1120a, component 1140a, and sensor 1150a correspond to a prescribed value for the position of the piston-armature assembly, a DC bias applied to the winding, static positional change of the piston-armature assembly, and a signal from a proximity/positional sensor such as a LVDT. The piston-armature assembly is positioned at the proper location when the difference between the measured and prescribed values meets some user defined threshold. The differencing operation is computed by summing block 1160a.

For the case of the control surface actuation to change or maintain depth, input 1110a, output 1120a, component 1140a, and sensor 1150a correspond to a command from the survey vessel, actuation of a motor which moves the control surfaces to the desired position, the control surfaces themselves, and the signal from an external pressure sensor, respectively. The projector is positioned at the desired depth when the difference between the commanded depth and that inferred from the external pressure sensor is either zero or meets some user-defined threshold. The differencing operation is computed by summing block 1160a.

For the case of the control surface actuation to maintain the proper (i.e., zero) roll angle, input 1110a, output 1120a, component 1140a, and sensor 1150a correspond to a command from the survey vessel, actuation of a motor which moves the control surfaces to the desired position, the control surfaces themselves, and the signal from an internal orientation sensor, respectively. The projector is positioned at the desired roll angle when difference between the commanded roll angle and that inferred from the orientation sensor is either zero or meets some user-defined threshold. The differencing operation is computed by summing block 1160a.

With regard to diagram 1100b, feedback control architecture 1110b is combined with adaptive in-line compensation filter 1120b to modify drive signal 1130b so that radiating piston acceleration 1140b is optimum from the stand-point of controlling the mechanical quality factor associated with the principal resonance of the transducer and to minimize the unit-to-unit variance in the sound radiated by the transducer in a spatially distributed array so that the far-field radiated signal is substantially equivalent to the superposition of all array elements operating in phase with the same source strength. With some modification, adaptive in-line compensation filter 1120b can provide means to correct drive signal 1130b to account for any potential deleterious effects from the mutual 3 radiation impedance associated with adjacent array elements (i.e., source coupling) as well as any minor aberrations associated with the magnitude and phase response of the combined piston-armature system.

Feedback control architecture 1110 is used to reduce the aforementioned quality factor and comprises plant transfer function 1111b, velocity feedback controller 1112b, and summing block 1113b. Plant transfer function 1111b relates the magnitude and phase response of the piston acceleration to the waveform fed into the power amplifier. Velocity feedback controller 1112b introduces additional damping via electrical means in the resonance region associated with the transducer to affect a stable band-limited response of the transducer. In this way the physical displacement associated with the moving armature assembly of FIG. 6 will not exceed the gap length and impact the central lamination circuit. The damping also minimizes the discontinuity associated with the phase response through resonance. Summing block 1113b combines the signal from feedback controller 1112b and adaptive in-line compensation filter 1120b to affect the desired result.

Adaptive in-line compensation filter 1120b is used to minimize the unit-to-unit variance in the sound radiated by the transducer in a spatially distributed array and consists of compensation filter 1121b, adaptive controller 1122b, control signal for desired piston acceleration 1123b, and summing block 1124*h*. Compensation filter 1121*b* and adaptive controller 1122*b* constitute a cascaded set of IIR and FIR filters designed to minimize the mean-square error associated with radiating piston acceleration 1140*b* and control signal 1123*b* using summing block 1124*b* to compute the difference between the two signals. In this way modest irregularities of plant transfer function 1111*b* can be accounted for so that the far-field radiated signal from the array is substantially equivalent to the superposition of all array elements operating in phase with the same source strength.

It is to be understood that the embodiment described herein is merely illustrative of the principles of this invention and that various modifications may be implemented by those skilled in the art without departing from the scope and spirit of the invention.

What is claimed is:

1. An underwater sound projector for producing time-harmonic waveforms, comprising:
a plurality of pistons actuated by an electromagnetic force generator having components comprising a stator, armatures, electrical coils, and permanent magnets, wherein said plurality of pistons and said components of the electromagnetic force generator are arranged to create mechanical and magnetic symmetry about a geometric center of the underwater sound projector to substantially cancel reaction loads that occur when the plurality of pistons are actuated, wherein said stator and said armatures have magnetic poles that employ a tapered geometry.

2. The underwater sound projector of claim 1, wherein the electromagnetic force generator relies on a variable reluctance principal and utilizes a superposition of AC and DC magnetic flux generated by the electrical coils and permanent magnets positioned within the stator to produce dynamic forces on the armatures that are substantially linear with the AC current applied to the electrical coils.

3. The underwater sound projector of claim 1, wherein each armature has a physical connection to a piston sized to generate sound waves without cavitation, wherein said physical connection comprises a shaft supported by linear bearings.

4. The underwater sound projector of claim 1, further comprising a feedback controller and an in-line adaptive compensation filter to reduce a mechanical quality factor of a fundamental resonance associated with assemblies comprising one of the plurality of pistons and one of the armatures, match a response of a plurality of said assemblies, and ensure that a far-field radiated signal from an array of said underwater sound projectors is substantially equivalent to a superposition of all array elements operating in phase with an identical source strength.

5. The underwater sound projector of claim 1, further comprising a pressure compensation system utilizing high pressure gas regulated by a feedback control system to balance a static load on the plurality of pistons resulting from submergence in water, wherein said high pressure gas is supplied from a plurality of storage tanks positioned within close proximity to said underwater sound projector, wherein said storage tanks comprise means to replenish the high pressure gas from an externally located source after the storage tanks are depleted.

6. The underwater sound projector of claim 1, further comprising means to finely adjust a static position of an assembly comprising one of the plurality of pistons and one of the armatures using a feedback control system that applies a DC bias to a same electrical coil as an AC drive signal.

7. The underwater sound projector of claim 1, wherein said underwater sound projector is contained within a cylindrical housing positioned in a substantially neutral buoyant hydrodynamic tow body comprising control surfaces operated by a feedback control system to adjust a submergence depth and a roll angle.

8. The underwater sound projector of claim 1, wherein said plurality of pistons employ one or more of a plane, conical, and convex geometry.

9. The electromagnetic force generator of claim 1, wherein said armatures and said stator are comprised of laminations made from one or more of a grain-oriented silicon steel and a cobalt steel, wherein said permanent magnets employ one or more of a Neodymium-Iron-Boron formulation and a Samarium-Cobalt formulation, and wherein said electrical coils employ wire have one or more of a circular, square, and rectangular cross-section.

10. An array of underwater sound projectors for producing time-harmonic waveforms, comprising:
a plurality of said underwater sound projectors, each comprising:
a plurality of pistons actuated by an electromagnetic force generator having components comprising a stator, armatures, electrical coils, and permanent magnets, wherein said plurality of pistons and said components of the electromagnetic force generator are arranged to create mechanical and magnetic symmetry about a geometric center of the underwater sound projector to substantially cancel reaction loads that occur when the plurality of pistons are actuated, wherein said stator and said armatures have magnetic poles that employ a tapered geometry; and
a load-bearing umbilical that connects said underwater sound projector to a vessel, transmits electrical power and pressurized gas to the underwater sound projector and provides a duplex data transmission medium to route commands from the vessel to the underwater sound projector and report machinery status to the vessel.

11. The array of underwater sound projectors of claim 10, wherein said underwater sound projectors are each controlled remotely by a processor positioned on the vessel and controlled locally by a processor positioned within each array element with said processors operating in a master-slave arrangement.

12. The array of underwater sound projectors of claim 10, wherein the electromagnetic force generator relies on a variable reluctance principal and utilizes a superposition of AC and DI magnetic flux generated by the electrical coils and permanent magnets positioned within the stator to produce dynamic forces on the armatures that are substantially linear with the AC current applied to the electrical coils.

13. The array of underwater sound projectors of claim 10, wherein each armature has a physical connection to a piston sized to generate sound waves without cavitation, wherein said physical connection comprises a shaft supported by linear bearings.

14. The array of underwater sound projectors of claim 10, wherein said underwater sound projectors further comprise a feedback controller and an in-line adaptive compensation filter to reduce a mechanical quality factor of a fundamental resonance associated with assemblies comprising one of the plurality of pistons and one of the armatures, match a response of a plurality of said assemblies, and ensure that a far-field radiated signal from an array of said underwater sound projectors is substantially equivalent to a superposition of all array elements operating in phase with an identical source strength.

15. The array of underwater sound projectors of claim 10, wherein said underwater sound projectors further comprise a pressure compensation system utilizing high pressure gas regulated by a feedback control system to balance a static load on the plurality of pistons resulting from submergence in water, wherein said high pressure gas is supplied from a plurality of storage tanks positioned within close proximity to said underwater sound projector, wherein said storage tanks comprise means to replenish the high pressure gas from an externally located source after the storage tanks are depleted.

16. The array of underwater sound projectors of claim 10, wherein said underwater sound projectors further comprise means to finely adjust a static position of an assembly comprising one of the plurality of pistons and one of the armatures using a feedback control system that applies a DC bias to a same electrical coil as an AC drive signal.

17. The array of underwater sound projectors of claim 10, wherein each of said underwater sound projectors is contained within a cylindrical housing positioned in a substantially neutral buoyant hydrodynamic tow body comprising control surfaces operated by a feedback control system to adjust a submergence depth and a roll angle.

18. The array of underwater sound projectors of claim 10, wherein said plurality of pistons employ one or more of a plane, conical, and convex geometry.

19. The electromagnetic force generator of claim 10, wherein said armatures and said stator are comprised of laminations made from one or more of a grain-oriented silicon steel and a cobalt steel, wherein said permanent magnets employ one or more of a Neodymium-Iron-Boron formulation and a Samarium-Cobalt formulation, and wherein said electrical coils employ wire having one or more of a circular, square, and rectangular cross-section.

* * * * *

UNITED STATES PATENT AND TRADEMARK OFFICE
CERTIFICATE OF CORRECTION

PATENT NO. : 9,562,982 B1
APPLICATION NO. : 14/700879
DATED : February 7, 2017
INVENTOR(S) : James A. McConnell et al.

It is certified that error appears in the above-identified patent and that said Letters Patent is hereby corrected as shown below:

In the Drawings

In Figure 7, embodiment 700c, replace "710b, 720b, 730b, 740b, 750b and 760b" with --710c, 720c, 730c, 740c, 750c and 760c--.

In the Specification

Column 1, Lines 9-10, please add the following after "Marine Seismic Surveys,'"" --(now U.S. Patent No. 9,625,598),--.

Column 2, Line 27, replace "The use of at coherent" with --The use of a coherent--.

Column 6, Line 3, replace "number electrical coils" with --number of electrical coils--.

Column 9, Line 37, replace "using a orientation sensor" with --using an orientation sensor--.

Column 14, Line 12, replace "projector is towed all of the lowering" with --projector is towed, all of the lowering--.

Column 15, Line 47, replace "6708" with --670a--.

Column 15, Line 54, replace "620," with --620a--.

Column 15, Line 60, replace "700a. 700b, and 700c" with --700a, 700b, and 700c--.

Column 16, Line 1, replace "750" with --750a--.

Column 16, Line 7, replace "740e" with --740c--.

Signed and Sealed this
Thirteenth Day of June, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,562,982 B1

Column 16, Line 32, replace "representation the projector" with --representation, the projector--.

Column 16, Line 39, replace "diagram 800a the electrical" with --diagram 800a, the electrical--.

Column 17, Line 45, replace "920e" with --920c--.

Column 18, Line 2, replace "reduction in for plane" with --reduction for plane--.

Column 21, Line 1, replace "1124h" with --1124b--.

In the Claims

In Claim 9, Line 17, replace "employ wire have" with --employ wires having--.

In Claim 12, Line 50, replace "AC and DI magnetic flux" with --AC and DC magnetic flux--.